US012770107B2

(12) United States Patent
Vaananen

(10) Patent No.: US 12,770,107 B2
(45) **Date of Patent: *Oct. 20, 2026**

(54) MOBILE SECRETARY CLOUD APPLICATION

(71) Applicant: Mikko Vaananen, Helsinki (FI)

(72) Inventor: Mikko Vaananen, Helsinki (FI)

(73) Assignee: Mikko Vaananen, Helsinki (FI)

( * ) Notice: Subject to any disclaimer, the term of this patent is extended or adjusted under 35 U.S.C. 154(b) by 217 days.

This patent is subject to a terminal disclaimer.

(21) Appl. No.: 18/540,939

(22) Filed: Dec. 15, 2023

(65) Prior Publication Data

US 2024/0127191 A1 Apr. 18, 2024

Related U.S. Application Data

(63) Continuation of application No. 18/298,805, filed on Apr. 11, 2023, now Pat. No. 11,893,545, which is a (Continued)

(51) Int. Cl.
*G06Q 10/1093* (2023.01)
*G06F 9/451* (2018.01)

(Continued)

(52) U.S. Cl.
CPC ......... *G06Q 10/1093* (2013.01); *G06F 9/453* (2018.02); *G06N 20/00* (2019.01); *G10L 15/30* (2013.01); *H04M 3/527* (2013.01)

(58) Field of Classification Search
CPC ............. G06Q 10/1093; G06Q 10/103; G06Q 10/0631; G06Q 10/107; G06F 9/453;

(Continued)

(56) References Cited

U.S. PATENT DOCUMENTS 6,499,021 B1 12/2002 Abu-Hakima
8,566,413 B2 10/2013 Horvitz (Continued)

FOREIGN PATENT DOCUMENTS

EP 3676776 A1 7/2020
WO 2014197635 A2 12/2014
WO 2019102066 A1 5/2019

OTHER PUBLICATIONS

Ayodele, T. et al., "Email Classification and Summarization: A Machine Learning Approach," IET Conference on Wireless, Mobile and Sensor Networks, 2007, retrieved from https://www.researchgate.net/publication/224386748_Email_classification_and_summarization_A_machine_learning_approach, retrieved on Mar. 12, 2019.

(Continued)

*Primary Examiner* — Akelaw Teshale
(74) *Attorney, Agent, or Firm* — Patterson + Sheridan, LLP

(57) ABSTRACT

The invention provides a method, system, and a software program product for assisting a user and/or managing tasks of the user, by a mobile secretary cloud application configured to operate in a mobile client device and cloud server network. The mobile secretary cloud application reads data from another software application and operates at least one of another application and a third application based on the read data. Further, Artificial intelligence is utilized by the mobile secretary cloud application for operating another application and the third application.

20 Claims, 14 Drawing Sheets

Related U.S. Application Data continuation of application No. 16/650,864, filed as application No. PCT/FI2018/050841 on Nov. 16, 2018, now Pat. No. 11,763,265, which is a continuation of application No. 16/109,726, filed on Aug. 22, 2018, now abandoned, and a continuation of application No. 16/109,731, filed on Aug. 22, 2018, now Pat. No. 11,184,471.

(60) Provisional application No. 62/590,291, filed on Nov. 23, 2017.

(51) Int. Cl.
*G06N 20/00* (2019.01)
*G10L 15/30* (2013.01)
*H04M 3/527* (2006.01)

(58) Field of Classification Search
CPC ....... G06F 9/44505; G06F 8/30; G06N 20/00; G10L 15/30; G10L 13/00; G10L 15/22; H04M 3/527
See application file for complete search history.

(56) References Cited

U.S. PATENT DOCUMENTS

| | | | | |
|---|---|---|---|---|
| 8,688,788 | B2 * | 4/2014 | Wilson | G06Q 10/10 379/88.05 |
| 9,699,129 | B1 | 7/2017 | Nelken | |
| 9,715,496 | B1 * | 7/2017 | Sapoznik | G06F 16/2237 |
| 9,794,198 | B2 * | 10/2017 | Niu | G06F 3/0481 |
| 9,805,371 | B1 * | 10/2017 | Sapoznik | G06F 16/2237 |
| 9,860,200 | B1 * | 1/2018 | Braun | H04L 51/046 |
| 10,243,889 | B2 * | 3/2019 | Niu | G06F 16/9535 |
| 10,243,890 | B2 * | 3/2019 | Miklos | G06Q 10/10 |
| 10,382,368 | B2 * | 8/2019 | Niu | G06F 3/0481 |
| 10,542,143 | B2 | 1/2020 | Segalis et al. | |
| 10,796,295 | B2 | 10/2020 | Subbarayan et al. | |
| 11,004,041 | B2 | 5/2021 | Stratvert et al. | |
| 11,089,132 | B2 | 8/2021 | Liensberger et al. | |
| 11,184,471 | B2 | 11/2021 | Vaananen | |
| 11,315,082 | B2 | 4/2022 | Vaananen | |
| 11,349,975 | B2 | 5/2022 | Vaananen | |
| 12,620,393 | B2 * | 5/2026 | Anwar Batcha | G10L 15/1815 |
| 2002/0116641 | A1 * | 8/2002 | Mastrianni | H04L 51/212 726/11 |
| 2004/0209606 | A1 | 10/2004 | Cleary | |
| 2006/0026277 | A1 | 2/2006 | Sutcliffe | |
| 2009/0165022 | A1 | 6/2009 | Madsen et al. | |
| 2011/0119133 | A1 | 5/2011 | Igelman | |
| 2012/0265432 | A1 | 10/2012 | Ashby | |
| 2013/0110519 | A1 | 5/2013 | Adam et al. | |
| 2014/0164509 | A1 * | 6/2014 | Lynch | H04L 67/30 709/204 |
| 2014/0280623 | A1 * | 9/2014 | Duan | H04L 51/02 709/206 |
| 2015/0057997 | A1 * | 2/2015 | Quast | G06F 16/24 704/9 |
| 2015/0281138 | A1 * | 10/2015 | Niu | G06F 16/9535 709/206 |
| 2016/0155442 | A1 | 6/2016 | Kannan et al. | |
| 2016/0241493 | A1 * | 8/2016 | Sharp | G06F 16/355 |
| 2016/0344870 | A1 | 11/2016 | Nair | |
| 2017/0010118 | A1 | 1/2017 | Hajj | |
| 2017/0132019 | A1 * | 5/2017 | Karashchuk | G06F 3/0482 |
| 2017/0180276 | A1 * | 6/2017 | Gershony | H04L 51/222 |
| 2017/0201471 | A1 * | 7/2017 | Miklos | G06Q 10/109 |
| 2017/0289305 | A1 | 10/2017 | Liensberger et al. | |
| 2017/0357638 | A1 * | 12/2017 | Schlesinger | G06F 16/3344 |
| 2018/0077088 | A1 * | 3/2018 | Cabrera-Cordon | G06F 16/90335 |
| 2018/0159805 | A1 * | 6/2018 | Jones | G06F 16/285 |
| 2018/0183737 | A1 | 6/2018 | Subbarayan et al. | |
| 2018/0253659 | A1 * | 9/2018 | Lee | H04L 51/42 |
| 2018/0359199 | A1 * | 12/2018 | Nguyen | G06F 16/2365 |
| 2019/0158647 | A1 | 5/2019 | Vaananen | |
| 2019/0386949 | A1 | 12/2019 | Vennam et al. | |
| 2020/0244605 | A1 | 7/2020 | Nagaraja et al. | |
| 2020/0279228 | A1 | 9/2020 | Vaananen | |
| 2022/0038569 | A1 | 2/2022 | Väänänen | |
| 2022/0261768 | A1 | 8/2022 | Väänänen | |
| 2022/0263935 | A1 | 8/2022 | Väänänen | |
| 2023/0101224 | A1 * | 3/2023 | Singh | G06F 16/3344 707/770 |
| 2023/0245073 | A1 | 8/2023 | Väänänen | |

OTHER PUBLICATIONS

Bickel, S. et al., "Learning from Message Pairs for Automatic Email Answering," ECML 2004, Proceedings 15th European Conference on Machine Learning, Pisa, Italy, retrieved from https://www.researchgate.net/publication/221112663_Learning_from_Message_Pairs_for_Automatic_Email_Answering, retrieved on Mar. 12, 2019.
Dredze, M.H., "Intelligent email: aiding users with AI," PhD Thesis, University of Pennsylvania, retrieved from https://www.cs.jhu.edu/~mdredze/publications/dredze_thesis.pdf, retrieved on Mar. 12, 2019.
"Semi-autonomous software agents: practical applications," Aug. 11, 2016, retrieved from https://web.archive.org/web/20160811095840/http://drwho.virtadpt.net/archive/2016-02-03/semi-autonomous-software-agents-practicalapplications, retrieved on Mar. 12, 2019.
International Search Report and Written Opinion mailed Mar. 19, 2019 in International Patent Application No. PCT/FI2018/050841.
Moujahid, Adil, "A Practical Introduction to Deep Learning with Caffe and Python," Jun. 26, 2016, pp. 20.
Supplementary Partial Search Report mailed Apr. 13, 2021 in counterpart European Patent Application No. 18880319.1.
PCT, International Preliminary Report on Patentability for Application PCT/FI2018/050841 dated May 26, 2020.
Extended European Search Report mailed Apr. 12, 2022 in counterpart European Patent Application No. 18880319.1.
Monroy-Hernandez, "How We Built a Virtual Scheduling Assistant at Microsoft", Harvard Business Review, Jul. 28, 2017.
Examination Report mailed on Feb. 28, 2024 in counterpart European Patent Application No. 18880319.1, 10 Pages.

* cited by examiner

MOBILE SECRETARY CLOUD APPLICATION

CROSS-REFERENCE TO RELATED APPLICATIONS

This disclosure is a continuation of U.S. patent application Ser. No. 18/298,805 filed Apr. 11, 2023, which is a continuation of U.S. patent application Ser. No. 16/650,864 filed Mar. 26, 2020, later issued on Sep. 19, 2023 as U.S. Pat. No. 11,763,265, which is a National Stage Entry of PCT Application No. PCT/FI2018/050841 filed Nov. 16, 2018, which claims priority to U.S. patent application Ser. Nos. 16/109,726 and 16/109,731, both filed on Aug. 22, 2018, and U.S. Provisional Patent Application Ser. No. 62/590,291 filed on Nov. 23, 2017, each of which is hereby incorporated by reference in their entirety.

TECHNICAL FIELD

Aspects of the invention relate to managing tasks of a user through a smartphone and more particularly to utilizing artificial intelligence in managing tasks of the user.

BACKGROUND

Modern smartphones carry numerous software applications for performing different specialized tasks. For example, a calendar application keeps record of activities scheduled for particular dates, an e-mailing application manages e-mails received and sent by a user, and image gallery manages images and videos captured using the smartphone. Similarly, there are numerous other applications for managing different data relevant to the user.

Many times, it becomes a tedious task for the user to manage such numerous applications. For example, the user may need to refer to a first application and may need to manage a second application based on the first application. For example, the user may need to access the emailing application for accessing an email comprising details of a meeting scheduled for the user. Based on retrieved details of the meeting, the user may need to revert with an acceptance of the meeting, set an alarm or a reminder for the date of meeting, set a navigation route for reaching a venue of meeting, or book flight/train/bus for reaching the venue of the meeting. Similarly, the user may need to manage several activities using different applications installed on his smartphone, based on information retrieved from one application. Present state of art merely comprises management of tasks based on user's instructions, either provided manually or via speech.

For example, Siri software in the iPhone may take verbal instructions from a user to operate the iPhone.

For example, US20130110519 describes a method to operate an intelligent digital assistant for assisting a user in task management. The intelligent digital assistant stores a plurality of predefined domains indicative of areas of services offered. From a user's request (speech input), one or more words are derived. Thereafter, a match is identified between the words derived from the user's request and words associated with the plurality of predefined domains. Based on a degree of match, a relevant domain for the user request is identified. Successively, a task is executed based on steps specified in a task flow associated with the relevant domain and task parameters derived from the user's request.

WO2014197635A2 describes an intelligent automated assistant system. The intelligent automated assistant system receives a search request from a user. The search request includes at least a speech input and one or more search criteria for identifying reservable items. In response to receiving the search request, a plurality of search results, corresponding to reservable items, are presented to the user. Successively, a reservation request is received for one search result amongst the plurality of search results. In response to the reservation request, a reservation procedure is executed to reserve a respective reservable item.

US20160155442 describes a digital personal assistant configured to perform tasks based on user instructions. Firstly, a user input is received, in form of a voice command or a text, for performing a task. Speech recognition is performed on the user input provided as voice command. Thereafter, the task is recognized and a registered action provider to provide with the task details. Successively, instructions are sent to the particular action provider for performing the task. User preferences are collected, and for example if the user selects one action provider 5 times in a row, on the $6^{th}$ time that provider is set as the default option.

Thus, the prior art features a number of simplistic workflows and automations, and even discloses very simple steps for learning the preference of the user in terms of one criterion. Individual automations of tasks, however, are not capable of reducing the wholistic administrative burden of the smartphone user in a significant way.

SUMMARY

It is an object of the invention to address and improve aforementioned deficiencies in above discussed prior art(s). The object of the invention is to provide an electronic artificial intelligence software-based secretary to every user, at a minimal fraction of the cost that it costs to hire a human secretary.

The central philosophy of the invention is not to guess what the user would do, given a certain input into the device. Ordinary consumers are notoriously inefficient in managing their time. Successful people become successful partly because they have hired and employ successful personal assistants (PA's) and secretaries. The central philosophy of the invention is how a professional secretary would handle the input, to maximize the benefit to the user. In order to achieve this aim, technical software embodiments are produced in the following.

It is an object of the invention to assist a user and/or manage administrative tasks of the user. Such assistance is provided to the user by a mobile secretary cloud application configured to operate in a mobile client device and cloud server network. Some embodiments of the invention are described using systems, methods, and software program products, as explained below.

A method for assisting a user and/or managing tasks of the user, by a mobile secretary cloud application configured to operate in a mobile client device and cloud server network, is in accordance with some embodiments of the invention and characterized by the following steps, the mobile client device is a smartphone connected to at least one cloud server network via a wireless communication network, a data analyzing module of the mobile secretary cloud application reads data from at least one other application, a data modifying module of the mobile secretary cloud application operates the at least one other application, based on data read from the at least one other application, and an artificial intelligence module of the mobile secretary cloud application uses artificial intelligence to operate the at least one other application for assisting a user or to use the at least one other application independently for performing at least one task for the user.

The mobile secretary cloud application may replicate secretary functions. In one case, the at least one other application is an e-mail or messaging application. The mobile secretary cloud application analyses messages and automatically sorts the messages to different folders. Further, the mobile secretary cloud application analyses messages and selects an indication sound automatically based on contents of the messages and sender and/or recipients of the messages. In another case, the at least one other application is a telephony application, and the mobile secretary cloud application makes phone calls on behalf of the user, automatically answers to messages, and prompts queries on behalf of the user, using a synthesized voice on a phone line. In yet another case, the at least one other application is a map application, and the mobile secretary cloud application provides a route calculator that provides a combined route of driving and walking based on e-mails, calendar entries, and location search. In a preferred embodiment the secretary application uses artificial intelligence to determine what would be the optimum way of conducting the three activities individually. Then, further in a preferred embodiment, the secretary application performs an optimum total fit of all of the combined activities for the user's day. This may involve for example doing the automated phone calls during the lunch break of the user, as an eating user is less likely to talk. The secretary application will propose a draft email response to a received email, selecting a short matter with a short response for a 10-minute break in the schedule of the user. In contrast for an entire silent afternoon in the office, the secretary application will present a 30-page project plan for inspection, as the secretary application knows that now is the convenient time for that. Similarly, for travel, the shortest route that allows the execution of the most urgent matters is selected in accordance with some embodiments of the invention.

A method for assisting a user and/or managing tasks of the user, by a mobile secretary cloud application configured to operate in a mobile client device and cloud server network is in accordance with some embodiments of the invention and characterized by the following steps,

- the mobile client device is a smartphone connected to at least one cloud server network via a wireless communication network,
- a data analyzing module of the mobile secretary cloud application is configured to read data from at least one other application,
- a data modifying module of the mobile secretary cloud application is configured to operate a third application, different from the at least one other application, based on data read from the at least one other application,
- an artificial intelligence module of the mobile secretary cloud application uses artificial intelligence to operate the third application for assisting a user or to use the third application independently for performing at least one task for the user.

In one embodiment, the third application is an e-mail or messaging application. The mobile secretary cloud application analyses messages and automatically sorts messages to different folders based on data derived from a calendar application or an Internet browser. Further, the mobile secretary cloud application analyses messages and selects an indication sound automatically based on contents of the messages and sender and/or recipients of the messages, using a text analyzer application as the at least one other application.

In another embodiment, the third application is a telephony application, and the mobile secretary cloud application makes phone calls on behalf of the user, automatically answers to messages on behalf of the user, and prompts queries to the user. The mobile secretary cloud application performs such functions using synthesized voice on the phone line for outgoing voice and using a voice recognition software application for incoming voice as the at least one other application.

In yet another embodiment, third application is a map application, and the mobile secretary cloud application provides a route calculator for providing a combined route of driving and walking based on data from the at least one other application, which data may comprise e-mails, calendar entries, search application, and Internet browser.

A mobile client device configured to execute a mobile secretary cloud application, wherein the mobile client device is a smartphone connected to at least one cloud server network via a wireless communication network, and the mobile client device comprises:

- a processor; and
- a memory connected to the processor, wherein the processor is configured to execute the mobile secretary cloud application to:
  - read data, using a data analyzing module, from at least one other application;
  - operate, using a data modifying module, the at least one other application based on data read from the at least one other application; and
  - operate, using an artificial intelligence module, the at least one other application for assisting a user or to use the at least one other application independently for performing at least one task for the user.

A mobile client device configured to execute a mobile secretary cloud application, wherein the mobile client device is a smartphone connected to at least one cloud server network via a wireless communication network, and the mobile client device comprises:

- a processor; and
- a memory connected to the processor, wherein the processor is configured to execute the mobile secretary cloud application to:
  - read data, using a data analyzing module, from at least one other application;
  - operate, using a data modifying module, a third application, different from the at least one other application, based on data read from the at least one other application,
  - operate, using an artificial intelligence module, the third application for assisting a user or to use the third application independently for performing at least one task for the user.

A software program product stored in a memory medium for assisting a user and/or managing tasks of the user, by a mobile secretary cloud application, characterized by the following steps,

- the software program product reads data from at least one other application;
- the software program product operates the at least one other application based on data read from the at least one other application; and
- the software program product utilizes artificial intelligence to operate the at least one other application for assisting the user or to use the at least one other application independently for performing at least one task for the user.

A software program product stored in a memory medium for assisting a user and/or managing tasks of the user, by a mobile secretary cloud application, characterized by the following steps, the software program product reads data from at least one other application;

the software program product operates a third application, different from the at least one other application, based on data read from the at least one other application; and the software program product utilizes artificial intelligence to operate the third application for assisting a user or to use the third application independently for performing at least one task for the user.

The best mode of the invention is considered to be a mobile secretary application that is connected to the cloud servers. In the best mode, the cloud network continuously collects and updates self-learning files for a number of secretarial tasks, and makes them available to the mobile secretary applications on the mobile client terminals. In the best mode, the mobile secretary application and the cloud network first determine what are the correct draft responses to each incoming task individually. Once the individual responses or actions to tasks have been determined, the agenda with which these responses or actions are most efficiently completed with the user in a unit of time, for example a day or a week, is determined. Once the agenda is determined, the secretary application and cloud network guide the user through the responses and activities in accordance with the determined agenda. Some secretarial activities are also operated on a continuous and instant basis, for example the playing of indication sounds for arriving messages, in the best mode.

The best mode can be applied to a number of uses, some of which may operate independently of the cloud network for long periods. For example, in the best mode, the selection of an indication sound is automatically based on contents of the messages and sender and/or recipients of the messages. In one case, AI is utilized to process contents of the messages and thereby select an indication sound based on contents of the messages. For example, the mobile client device of the user may receive a pleasant message, stating "You did an incredible job." Similarly, the user may receive other pleasant messages, such as "Thank you for your kind support," "I am glad to hear about your promotion," and "love you my son." The email and message processing module 510, utilizing AI, may learn upon several such messages, and may determine that such messages convey pleasant gestures. The email and message processing module 510 may learn based on processing of words present in the emails and messages. For example, in present case, the words "incredible," "thank you," "kind," "glad," "promotion," and "love" infer pleasant gestures from a sender, and the email and message processing module 510 may learn such meaning. Based on such learning, the email and message processing module 510 may play uplifting or romantic audio, respectively, as the indication sound.

In contrast, when the mobile client device of the user may receive a harsh message, stating "poor job." Similarly, the user may receive other harsh messages, such as "you've passed the deadline," "I won't tolerate such careless attitude," and "hate you." The email and message processing module 510, utilizing AI, may learn upon several such messages, and may determine that such messages convey harsh gestures. The email and message processing module 510 may learn based on processing of words present in the emails and messages. For example, in present case, the words "poor," "passed deadline," "won't tolerate," and "hate" infer harsh gestures from a sender, and the email and message processing module 510 may learn such meaning. Based on such learning, the email and message processing module 510 may play a loud beep or warning sound as the indication sound.

Further, the email and message processing module 510 may also derive meanings based on analysis of smileys/emoticons and special characters present in the emails and messages. The special characters may include "!!," "?" and other known special characters. For example, the user may receive a message stating "you again!!" or "what have you done?" The email and message processing module 510 may learn that harsh gestures are implied by such messages. Based on such learning, the email and message processing module 510 may play the loud beep or warning sound as the indication sound. The indication sound selection embodiment can be implemented as a cloud server-client device configuration, but also in the client device only configuration as it requires few or no updates from the network. In an alternative implementation of the best mode, the subject line of the email or message or some content of the message is read out loud to the user, so that the user gets a quick indication of the contents without having to access the message itself via the screen.

The "cognitive process", "self-improved activity" are terms of machine learning that have been defined in "Introducing Artificial Intelligence A Graphic Guide, Henry Brighton, Iconbooks 2003" and "Machine Learning The New AI, Ethem Alpaydin, The MIT Press 2016". These books are cited here as reference. The book "The Technological Singularity, Murray Shanahan, The MIT Press, 2015." is also cited here as reference.

A method of providing automatic secretarial support for a mobile phone user comprises a mobile client device and cloud servers and cloud software and is characterized by the following steps:

a mobile cloud secretary application records user inputs thereby recording the cognitive process of the user, the mobile secretary cloud application repeats new instructed activities as recorded by the cognitive process of the user, the mobile secretary application derives a self-improved activity from crowd sourced data, the mobile secretary application replaces an instructed activity with a self-improved activity.

In one aspect of some embodiments of the invention the mobile secretary application records whether the user accepts the self-improved activity, corrects the self-improved activity or rejects the self-improved activity with his own activity.

In aspects of some embodiments of the invention the mobile secretary application records an accepted self-improved activity as a default option for future use. In another aspect, the mobile secretary application records the user corrected version of the corrected self-improved activity as a default option for future use. In a further aspect of some embodiments of the invention, the mobile secretary application records the rejected self-improved activity as failed and does not suggest it again.

A telecommunication system comprising mobile client devices and cloud server computers, and a mobile secretary cloud software is in accordance with of some embodiments the invention and characterized in that, the mobile secretary cloud software either comprises or is configured to operate:

a cognitive software module configured to record user inputs and derive and record the cognitive process of the user, a self-improvement module configured to analyze the cognitive process of the user and suggest improvements by replacement to the machine learned cognitive processes, a crowd-sourcing module from which the self-improvements to machine learned processes are configured to be derived.

A mobile secretary cloud application software program product stored in a memory medium, characterized in that it either comprises or is configured to operate:

a cognitive software module configured to record user inputs and derive and record the cognitive process of the user, a self-improvement module configured to analyze the cognitive process of the user and suggest improvements by replacement to the machine learned cognitive processes, a crowd-sourcing module from which the self-improvements to machine learned processes are configured to be derived.

Some embodiments of the invention are described in the dependent claims.

DETAILED DESCRIPTION

The present disclosure provides a mobile client device, a method, and a software program product for assisting a user and/or managing tasks of the user. The tasks may be managed by a mobile secretary cloud application accessing an application installed in a mobile client device of the user. The mobile secretary cloud application may be available over Google Play™ store for downloading over Android smartphones and over App Store™ for downloading over iOS™ smartphones. The mobile secretary cloud application may either be available for free or as a paid application.

The mobile secretary cloud application is henceforth explained to utilize Artificial Intelligence for several purposes. Known machine learning tools/deep learning frameworks may be utilized with or without modifications. A few such known machine learning tools comprise Caffe™, Api.ai™, TensorFlow™, Mahout™, OpenNN™ H20™, MLIib™, NuPIC™, OpenCyc™, Oryx 2™, PredictionIO™, SystemML™, TensorFlow™, and Torch™.

Figure 1A:
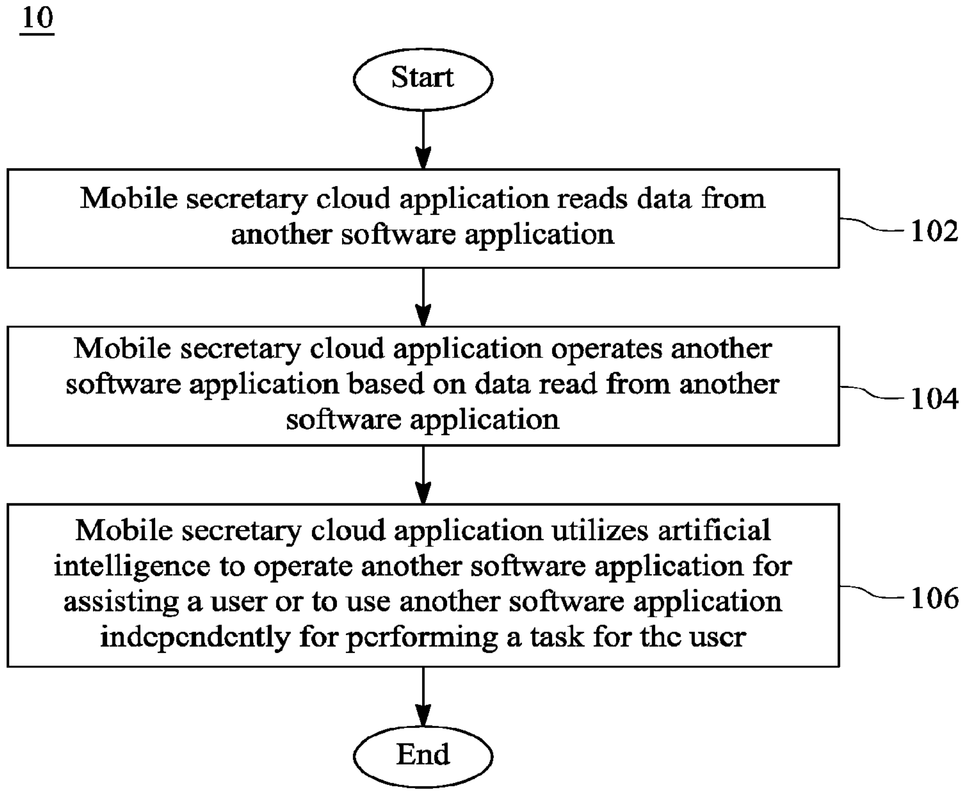
FIG. 1A illustrates an embodiment 10 of a flow chart showing a method of implementation of a mobile secretary cloud application for operating another software application, according to an embodiment.

FIG. 1A demonstrates an embodiment 10 of a method of implementation of a mobile secretary cloud application for operating another software application, as a flow diagram. The method could be implemented in a system identical or similar to embodiment 20 and 50 in FIG. 2 and FIG. 5, for example. The end-user of the method could use a user interface identical or similar to that disclosed with embodiment 30, 31, 60, 61, 62, and 63 in FIG. 3A, FIG. 3B, FIG. 6A, FIG. 6B, FIG. 6C, and FIG. 6D.

FIG. 2 illustrates an embodiment 20 of a block diagram of a client system 200 executing the mobile secretary cloud application. The system comprises interface(s) 202, processor 204, Graphical Processing Unit (GPU) 206, and memory 208. The memory 208 comprises a data analyzing module 210, a data modifying module 212, and an Artificial Intelligence (AI) module 214. Different phases of FIG. 1A and FIG. 1B will now be explained in conjunction with modules of FIG. 2.

Interface(s) 202 are used to interact with or program the system 200. The interface(s) 202 may either be a Command Line Interface (CLI) or a Graphical User Interface (GUI) or both.

The processor 204 may refer to any one or more microprocessors, finite state machines, computers, microcontrollers, digital signal processors, logic, a logic device, an electronic circuit, an application specific integrated circuit (ASIC), a field-programmable gate array (FPGA), a chip, etc., or any combination thereof, capable of executing computer programs or a series of commands, instructions, or state transitions. The processor 204 may also be implemented as a processor set comprising, for example, a general-purpose microprocessor and a math or graphics coprocessor. The processor 204 may be selected, for example, from the Intel® processors such as the Itanium® microprocessor or the Pentium® processors, Advanced Micro Devices (AMD®) processors such as the Athlon® processor, UltraSPARC® processors, microSPARC™ processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, etc. The control unit disclosed herein is not limited to employing the processor 204. The control unit may also employ a controller or a microcontroller and other electronics components.

The memory 208 includes a computer readable medium. A computer readable medium may include volatile and/or non-volatile storage components, such as optical, magnetic, organic or other memory or disc storage, which may be integrated in whole or in part with a processor, such as processor 204. Alternatively, all or part of the entire computer readable medium may be remote from processor 204 and coupled to processor 204 by connection mechanism and/or network cable. In addition to memory 208, there may be additional memories that may be coupled with the processor 204 or the GPU (Graphics Processing Unit) 206.

In an embodiment, the system 200 is integrated with a cloud server 216, via a communication network 220. The cloud server may comprise a GPU 218 or multiple GPUs. The communication network 220 used for the communication in some embodiments of the invention is the wireless or wireline Internet or the telephony network, which is typically a cellular network such as UMTS- (Universal Mobile Telecommunication System), GSM- (Global System for Mobile Telecommunications), GPRS- (General Packet Radio Service), CDMA- (Code Division Multiple Access), 3G-, 4G-, Wi-Fi and/or WCDMA (Wideband Code Division Multiple Access)-network.

In an example, the cloud server 216 may comprise a plurality of servers (not shown). In an example implementation, the cloud server 216 may be any type of a database server, a file server, a web server, an application server, etc., configured to store data related to the mobile secretary cloud application and/or other applications. In another example implementation, the cloud server 216 may comprise a plurality of databases for storing the data files. The databases may be, for example, a structured query language (SQL) database, a NoSQL database such as the Microsoft® SQL Server, the Oracle® servers, the MySQL® database, etc. The cloud server 216 may be deployed in a cloud environment managed by a cloud storage service provider, and the databases may be configured as cloud-based databases implemented in the cloud environment.

Due to the self-learning or machine learning aspects of some embodiments of the invention also a neural network type of implementation for the client device 200 and/or the cloud server 216 is possible. In some embodiments both the client device 200 and/or the cloud server 216 may be realized as any of the following: SIMD (Single Instruction, Multiple Data) machine, MIMD (Multiple Instruction, Multiple Data) machine, and/or NIMD (Neural Instruction, Multiple Data) machine.

The cloud server 216 which may include an input-output device usually comprises a monitor (display), a keyboard, a mouse and/or touch screen. However, typically there is more than one computer server in use at one time, so some computers may only incorporate the computer itself, and no screen and no keyboard. These types of computers are typically stored in server farms, which are used to realize the cloud network used by the cloud server 216 some embodiments of the invention. The cloud server 216 can be purchased as a separate solution from known vendors such as Microsoft and Amazon and HP (Hewlett-Packard). The cloud server 216 typically runs Unix, Microsoft, iOS, Linux or any other known operating system, and comprises typically a microprocessor, memory, and data storage means, such as SSD flash or Hard drives. To improve the responsiveness of the cloud architecture, the data is preferentially stored, either wholly or partly, on SSD i.e. Flash storage. This component is either selected/configured from an existing cloud provider such as Microsoft or Amazon, or the existing cloud network operator such as Microsoft or Amazon is configured to store all data to a Flash based cloud storage operator, such as Pure Storage, EMC, Nimble storage or the like. Using Flash as the backbone storage for the cloud server 216 is preferred despite its high cost due to the reduced latency that is required and/or preferred for retrieving user data, user preferences, and data related to mobile/software applications etc.

The GPU (Graphical Processing Unit) 206 or 218 may refer to an electronic circuit designed to manipulate and alter computer graphics, images, and memory to accelerate the analysis and creation of images/patterns. GPUs can be used in embedded systems, mobile phones, personal computers, workstations, game consoles, etc. The GPU 206 or 218 may be selected, for example, from AMD GPUs, Nvidia GPUs, Intel GPUs, Intel GMA, Larrabee, Nvidia PureVideo, SoC, etc. In some embodiments of the invention, typically the machine learning or Artificial Intelligence parts of the processing are configured to be executed by the GPU, due to the large number of parallel processing or comparative processing required in machine learning.

The system 200 may be configured as a mobile terminal computer, typically a smartphone and/or a tablet that is used to manage tasks of the user by operating software applications installed on the smartphone, etc. The system 200 is typically a mobile smartphone, such as iOS, Android or a Windows Phone smartphone. The GPU 206 or 506 present in the smartphone or GPU 218 or 518 present in cloud server 216 or 516 respectively, may process data of software applications installed on the smartphone. The processed data may be used for managing the tasks of the user. All of the three configurations are possible in accordance with some embodiments of the invention, the first where the GPU 206 is only on the mobile client device 200, the second where the GPU 218 is only on the cloud server 216, the third where both the cloud server 218 and the mobile terminal device 200 have the GPU 206, 218.

However, it is also possible that the system 200 is a mobile station, mobile phone or a computer, such as a PC-computer, Apple Macintosh-computer, PDA-device (Personal Digital Assistant). The system 200 could further be a device having an operating system such as any of the following: Microsoft Windows, Windows NT, Windows CE, Windows Pocket PC, Windows Mobile, GEOS, Palm OS, Meego, Mac OS, iOS, Linux, BlackBerry OS, Google Android and/or Symbian or any other computer or smart phone operating system.

The description encompasses several modules, wherein the modules are to be interpreted as programmed instructions stored in a segment of the memory 208 or 508, which when executed by the processor 204 or GPU 206, 218 performs certain functionalities.

Any features of embodiment 20 may be readily combined or permuted with any of the other embodiments 10, 11, 21, 30, 31, 40, 41, 50, 60, 61, 62, 63, 71, 81, and/or 82 in accordance with the invention.

In phase 102, the data analyzing module 210 of the mobile secretary cloud application or the GPU 206 and/or 218 reads data from another software application. Another software application indicates a mobile application different from the mobile secretary cloud application. Reading the data signifies extracting data entries related to a user. For example, when a calendar application is accessed, all events scheduled in a particular month, dates and timings of such events, and priorities associated with such events are accessed. The events may comprise meetings, interviews, journeys, birthdays, anniversaries, etc. In one case, the GPU 206 and/or 218 may read the data belonging to another software application from Random Access Memory (RAM) or cache memory. Further, metadata belonging to the data may also be fetched in one embodiment.

In another embodiment, an e-mail application may be accessed to retrieve all e-mails present in a mailbox of the user. The data analyzing module 210 of the mobile secretary cloud application or the GPU 206 and/or 218 may access the e-mail application. All e-mails present in the e-mailbox i.e. received, sent, transmission in progress, and recently deleted may be accessed.

In phase 104, the data modifying module 212 of the mobile secretary cloud application or the GPU 206 and/or 218 operates another software application based on data read from another software application. For example, upon accessing data from a messaging application, the data modifying module 212 or the GPU 206 and/or 218 may manage messages present in the messaging application. In one case, the data modifying module 212 or the GPU 206 and/or 218 may read details related to each message present in the messaging application, such as details of senders, content of a message, and contents of other messages received from a sender. Based on processing of such details, the data modifying module 212 or the GPU 206 and/or 218 may segregate each message into a respective category, such as segregation by category of message, segregation based on sender of messages, and segregation by priority of messages.

In another embodiment, upon accessing the e-mails, the data modifying module 212 or the GPU 206 and/or 218 may manage the e-mails. The data modifying module 212 or the GPU 206 and/or 218 may sort the e-mails based on priority, time, name of sender(s), name of receiver(s), and contents of the e-mails. For example, while the user receives an e-mail towards an acknowledgement of an online order, an instant pop-up message may be displayed on the system 200. Successively, based on processing of content present in the e-mail, the data modifying module 212 or the GPU 206 and/or 218 may mark the email as read, automatically archive, and/or delete the e-mail.

In one embodiment, the GPU 206 and/or 218 may utilize Convolutional Neural Network (CNN) for processing the data related to the messaging application, e-mail application, or other applications. For example, there could be numerous messages present from several senders, and the GPU may perform multi-thread processing for obtaining precise and timely output based on the processing. In one case, the GPU may comprise Combined Unified Device Architecture (CUDA) for enabling the multi-thread processing of the data. For example, the GPU 206, 218 and/or processor 204 could generate draft response emails in response to received emails. To these emails the GPU 206, 218 and/or processor 204 would automatically write text that they have machine learned to be relevant or deduce by Artificial Intelligence that will almost certainly be present in the response email. For example, if there are multiple emails that address a certain party "Dear Sir/Madam", the mobile secretary cloud application will begin the draft response email in that way too.

In phase 106, the Artificial Intelligence (AI) module 214 of the mobile secretary cloud application or the GPU 206 and/or 218 utilizes Artificial Intelligence (AI) to operate another software application. The AI module 214 or the GPU 206 and/or 218 operates another software application for assisting a user and/or to perform a task for the user. In one case, to segregate the messages present in the messaging application, the AI module 214 or the GPU 206 and/or 218 utilizes AI for processing of different details related to each message. AI may be used to process content of each message to segregate each message into a respective category. Processing the content of each message may comprise processing of title, words, hyperlinks, and dates present in each message. Based on processing of such content, the AI module 214 or the GPU 206 and/or 218 utilizing AI may segregate each message into a related category.

In addition to analysing the semantic content of messages with AI, the messages can be visually analysed using AI. Consider an example of using convolutional neural networks (CNN) for recognizing an email that just arrived in the inbox. CNN refers to artificial neural networks that model visual perception by an animal or a human. The CNN algorithms may be employed for image recognition tasks preferably emulating the way that a human secretary views an email in accordance with some embodiments of the invention. The CNN comprises multiple layers of receptive fields that are small neuron collections configured to process portions of an input image. The output of each layer is successively tiled such that the input regions overlap to obtain a representation of the original image. In an embodiment, a deep learning framework called Caffe that uses C++, MATLAB, and Python programming languages is used for implementing the CNN. Caffe is a CNN library that is configured to support both CPU 290 and GPU operations. In this example, the GPU 210 or 240 used by the mobile secretary cloud application 200 may for example be a NVIDIA GPU with 15 GB RAM.

A pre-defined dataset comprising, for example, 30000 images of legitimate business emails and spam emails is used as a training dataset for training the network. The training dataset comprises labels associated with each image. In an example, the training dataset is downloaded from Kaggle which is a predictive modelling and analytics platform. The labelled images 422 and 424 are pre-processed and stored in a Python script format.

In this example, the GPU 206 and/or 218 executes histogram equalization on the labelled images 422 and 424 of the training dataset. Histogram equalization is a technique used to adjust image intensities by using the image's histogram features. Histogram equalization enhances contrast of the images 422 and 424. The images resulting after histogram equalization of the images 422 and 424 are illustrated by images 426 and 428, respectively. The GPU 206 and/or 218 performs image resizing to resize the images of the emails, for example, to a 227×227 format. Each image of email 430, 432 is labelled after performing the histogram equalization. The training dataset is then divided into 2 subsets. First subset 434 called the training set comprises $5/6^{th}$ portion of the training images that are used for training a model. The second subset called the validation set 436 comprises $1/6^{th}$ portion of the training images of emails that are used for calculating and validating accuracy of the model. The subsets 434 and 436 are stored in the cloud database of the cloud server 216.

Features such as, histogram of oriented gradients (HoG), Scale-invariant feature transform (SIFT), etc., of the images are extracted from the training images 430 and 432 by using a feature extraction software such as, MATLAB. The extracted image features provide a description of features of an object present in an image 430 or 432 that are used in image classification. Once the subsets 434 and 436 are created, the GPU 206/218 generates the mean image for the training data. The GPU 206/218 subtracts the mean image from each input image of the training set 434. The GPU 206/218 then performs feature standardization to make each feature in the dataset have a zero mean and a standard deviation of 1 such that all image data features are normalized. Feature standardization is used to ensure that measurement comparisons between features that may have different units (such as audio signals and pixel values of the image data) are normalized. In feature standardization the image features are centred on a zero mean with a standard deviation of 1. The mean image of the training set 434 is calculated. The mean image is subtracted from each image in the training set 434. The resulting value of each image is divided by its standard deviation. The resulting value of each image feature is hence normalized and can be further used for creating the training model.

The GPU 206/218 then defines the training model by selecting CNN architecture. In this example, the GPU 206/218 uses a CNN architecture model such as, Alexnet for defining the model. Alexnet is a CNN framework executed on GPUs implemented in CUDA. CUDA is a parallel computing platform and an application programming interface (API) model created by Nvidia that can be used for general purpose processing along with graphics processing.

The model is then optimized using a solver algorithm. The solver algorithm is a type of a stand-alone computer program or a software library that is configured to optimize the training model by computing an accuracy of the model using the training dataset. The solver algorithm computes the accuracy by iteratively using the validation set 436. For example, the solver algorithm may use the validation set 436 for every 1000 iterations in an optimization process of 40000 iterations that takes a snapshot of the trained model at every 5000$^{th}$ iteration.

The GPU 206/218 then performs model training using the results of the solver algorithm. During the training process, the GPU 210/240 monitors losses and the model accuracy. In an example, Caffe takes a snapshot of loss and model accuracy of the trained model at every 5000$^{th}$ iteration. Then the GPU 210/240 plots a learning curve of the losses as a function of the number of iterations as depicted in the graph 438 of FIG. 2B. Multiple iterations are performed until a steady-state accuracy rate is achieved. For example, as can be seen in the graph 438 the trained model achieves an accuracy rate of about 90% that stops improving after about 3000 iterations.

Once the trained model is ready, the GPU 206/218 starts predicting accuracy of unseen images from a testing dataset downloaded from a Kaggle platform. The GPU 206/218 reads an image of an email from the testing dataset, processes the image, and calculates a probability of accuracy, for example, 0 for non-business email, and 1 for a legitimate business email. For example, if an accuracy rate of 98% is achieved, that image is considered to be of a legitimate business email.

In one embodiment, the model is stored in the cloud database of the cloud server 216 which is accessible by the mobile secretary application of the terminal device 200 via the network 220. In another embodiment, the model may be stored in the local memory 208 of the smartphone 200. The GPU 206 and/or 218 analyses an input image of an inbox email 420 using the model. The image of the inbox email 420 is compared with the features of a legitimate business email stored in the model. The GPU 206 and/or 218 generates an output 245 that identifies the inbox email to be a legitimate business email 245 if the comparison yields a high accuracy rate. In this example, the GPU 206 and/or 218 identifies that the input image is of a legitimate business email that is related to a legal matter. The GPU 206 and/or 218 identifies the business email 245 to relate to a court case the user has. The CPU 204 may compare historical data associated with the business email 245 stored in the local memory of the mobile terminal 200 or the cloud server 216 to determine that the output, business email 245 relates to a court case that has the main trial in 3 days in the calendar application. Hence, the CPU 204 may recommend the user to read the email right away. In an embodiment, the business email 245 is placed on the idle screen scale of the mobile terminal 200. A draft response email may be drafted by the mobile secretary cloud application into the draft folder of the email application, for further editing and approval by the user. Subsequent to the response, the email 245 is placed into folder "legal" in the email application. The end result of some embodiments of this invention should be the computerized replica of the process where a human secretary looks at the email to see what it is like, and/or reads all or part of it, and then sorts it to the relevant folder, and prepares obvious further action, for example a draft response to the arrived email.

By "machine learning" or "artificial intelligence" we mean that the computer system has been trained to make determinations based on a training set of samples, and/or has been tested with a validation set to have a known error rate as explained before.

Messages or emails can be classified either by analysing them semantically, or visually as explained before. It is also in accordance with some embodiments of the invention to use the semantic and the visual AI analyses together to classify the messages or emails even more accurately. The visual AI analysis as explained in the above can be applied mutatis mutandis to other secretarial tasks that would be done by the visual perception of the human secretary in accordance with some embodiments of the invention. Preferably the GPU carries out the visual AI tasks, and the CPU carries out the semantic AI tasks in some embodiments of the invention.

Any features of embodiment 21 may be readily combined or permuted with any of the other embodiments 10, 11, 20, 30, 31, 40, 41, 50, 60, 61, 62, 63, 71, 81, and/or 82 in accordance with the invention.

Although the example discussed herein is provided with reference to using convolutional neural networks that uses the deep learning framework Caffe, C++, MATLAB, and Python programming languages, the NVIDIA GPU, the Kaggle dataset, and the Alexnet CNN architecture model, it is to be understood that the mobile client 200 and the cloud server 216, in another embodiment, may be implemented using any other deep learning algorithm that uses any other framework, programming language, GPU, dataset, and/or architecture model. The example included herein is described with reference to the publication "A PRACTICAL INTRODUCTION TO DEEP LEARNING WITH CAFFE AND PYTHON", which is included here as a reference.

In another embodiment, to segregate the e-mails present in the e-mail application, the AI module 214 or the GPU 206 and/or 218 utilizes AI for processing of different details related to each e-mail. AI may be used to process content of each e-mail, and to segregate each e-mail into a respective category. Processing the content of each e-mail may comprise processing of title, content, hyperlinks, dates, images, and attachments present in each e-mail. Based on processing of such semantic content, the AI module 214 or the GPU 206 and/or 218 and/or CPU utilizing AI may segregate each e-mail into a related category, so that emails are organized into folders of different categories, and emails classified to be in the same semantic category are placed in the same folder.

In one embodiment, the GPU may utilize "Caffe" as the AI for operating another software application. In some embodiments Processing of data by the GPU running the AI may provide leverage for faster processing of data. For example, the messages may be simultaneously processed based on their title, words, hyperlinks, and dates present therein. The semantic AI analysis of some embodiments of the invention can be possibly implemented in some embodiments with a ready software package such as NLP, Leiki, Thron or similar semantic AI engine.

It is also in accordance with some embodiments of the invention to segregate emails based on images taken of the emails only, based on the aforementioned content analysis of the emails only, or by using the two methods in a mix.

Any features of embodiment 10 may be readily combined or permuted with any of the other embodiments 11, 20, 21, 30, 31, 40, 41, 50, 60, 62, 63, 71, 81, and/or 82 in accordance with the invention.

Figure 1B:
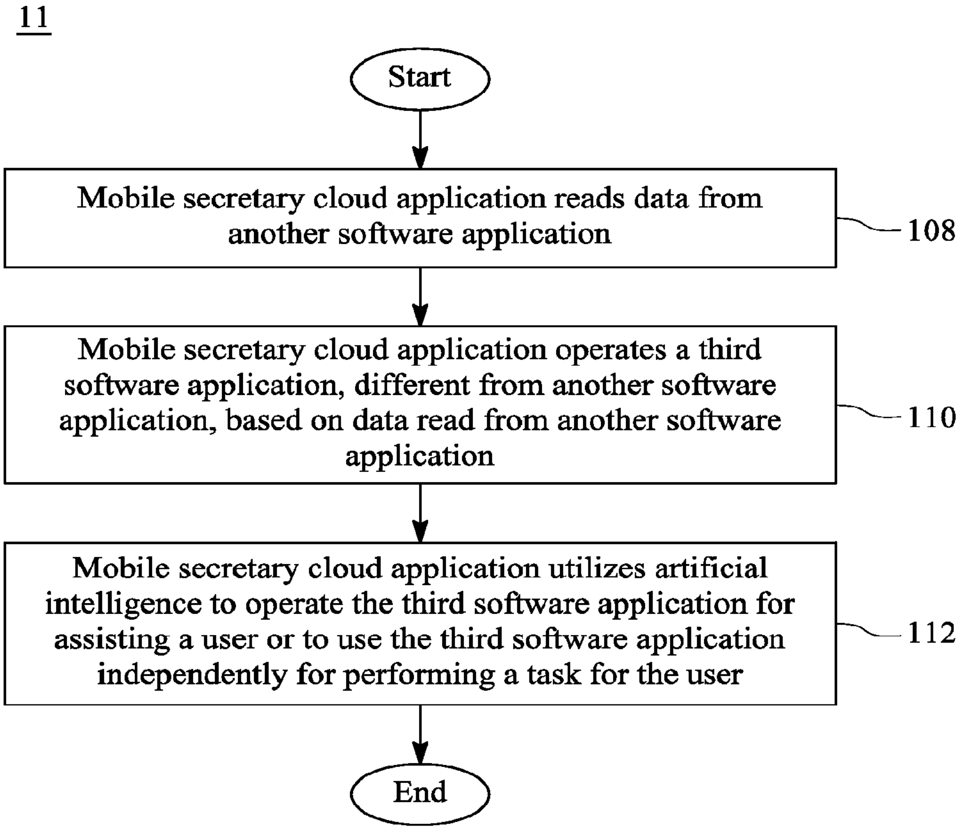
FIG. 1B illustrates an embodiment 11 of a flow chart showing a method of implementation of a mobile secretary cloud application for operating a third software application, using another software application, according to an embodiment.

FIG. 1B demonstrates an embodiment 11 of a method of implementation of a mobile secretary cloud application for operating a third software application, using another software application, as a flow diagram. The method could be implemented in a system identical or similar to embodiment 20 in FIG. 2 and embodiment 50 in FIG. 5 for example. The end-user of the method could use a user interface identical or similar to that disclosed with embodiment 30, 31, 60, 61, 62, and 63 in FIG. 3A, FIG. 3B, FIG. 6A, FIG. 6B, FIG. 6C, and FIG. 6D.

In phase 108, the data analyzing module 210 of the mobile secretary cloud application using the GPU 206 and/or 218 reads data from another software application. Another software application indicates a mobile application different from the mobile secretary cloud application. Reading the data signifies extracting all entries related to the user from another software application. For example, while a calendar application is accessed, all events scheduled in a particular month, dates and timings of such events, and priorities associated with such events are accessed. The events may comprise meetings, interviews, journeys, birthdays, anniversaries, etc. In one case, the GPU 206 and/or 218 may read the data belonging to another software application from Random Access Memory (RAM) or cache memory. Further, metadata belonging to the data may also be fetched in one case.

In another case, an e-mail application may be accessed to retrieve all e-mails present in a mailbox of the user. The data analyzing module 210 of the mobile secretary cloud application or the GPU 206 and/or 218 may access the mail application. All mails present in the mailbox i.e. received, sent, transmission in progress, and recently deleted may be accessed.

In phase 110, the data modifying module 212 of the mobile secretary cloud application or the GPU 206 and/or 218 operates a third software application based on data read from another software application. The third software application indicates a mobile application different from the mobile secretary cloud application and another software application. In one case, another software application may refer to the messaging application and the third software application may refer to the calendar application. The data modifying module 212 and/or the GPU 206, 218 and/or processor may extract details related to a scheduled meeting, from at least one message stored in the messaging application. Based on extracted details, such as time and place of meeting/event, the data modifying module 212 or the GPU 206, 218 and/or processor 204 may schedule a reminder/event in the calendar application. The reminder/event may be scheduled based on date and time of the meeting, or persons to be contacted or met in the meeting.

In another embodiment, the data modifying module 212 or the GPU 206, 218 and/or processor 204 may extract details of a journey planned with friends. Details of the journey may comprise a date and a flight number for booking seats for the journey. Based on extracted details, the data modifying module 212 or the GPU 206, 218 and/or processor 204 may book flight tickets using a related application. For example, the extracted details may comprise text mentioning "journey begins on Dec. 19, 2017 at 9:30 AM from Delhi, India to New York, United States and returning back on Dec. 28, 2017." Using such date, time, and place of origin and destination, the data modifying module 212 or the GPU 206, 218 and/or operator 204 may reserve flight tickets automatically.

In phase 112, the AI module 214 of the mobile secretary cloud application or the GPU 206, 218 and/or processor 204 utilizes Artificial Intelligence (AI) to operate the third software application. The AI module 214 or the GPU 206, 218 and/or processor 204 operates the third software application for assisting a user and/or to perform a task for the user. In one case, to identify and successively extract details related to the scheduled meeting, the AI module 214 or the GPU 206, 218 and/or processor 204 utilizes AI for processing of different details present in the at least one message. Processing the content of each message may comprise processing of title, words, hyperlinks, dates and times, and passwords present in the at least one message. Based on processing of such content, the AI module 214 or the GPU 206, 218 and/or processor 204 may schedule the reminder/event in the calendar application.

In one case, the AI module 214 or the GPU 206, 218 and/or processor 204 utilizes Artificial Intelligence (AI) to process the text "journey begins on Dec. 19, 2017 at 9:30 AM from Delhi, India to New York, United States and returning back on Dec. 28, 2017." Using AI, the AI module 214 or the GPU 206, 218 and/or processor 204 may identify the date, time, and place of origin and destination details related to the journey. The data modifying module 212 or the GPU 206, 218 and/or processor searches for a flight matching the journey details. Successively, upon finding a suitable flight, the AI module 214 or the GPU 206, 218 and/or processor books a required number of flight tickets.

Choosing which ticket to buy, or present to user for purchase is determined similarly as explained before with classifying emails. A human secretary would look at the emails, and see the typing, layout, language and everything to make a visual determination of whether the email is a legitimate business email. Choosing a ticket is a slightly different process. A human secretary would not look and determine the choice by appearance. Instead, price, duration, departure time, arrival time and transit time in a stopover are the key factors in choosing what ticket to buy.

First a training set of e.g. 30,000 flight tickets is created. A validation set comprising $1/6^{th}$ of the flights is also created. Then mobile secretary cloud application is taught what flights are acceptable and what are unacceptable. For example, with the validation set, only those fights with a low price, short transit time, short duration, coinciding departure and arrival times are selected. This is done for example by calculating the normalized standard deviations for each parameter and assigning them weights. The ticket that deviates the least from an acceptable ticket is either bought or presented to the user for purchase automatically.

Any features of embodiment 11 may be readily combined or permuted with any of the other embodiments 10, 20, 21, 30, 31, 40, 41, 50, 60, 61, 62, 63, 71, 81, and/or 82 in accordance with the invention.

Figure 3A:
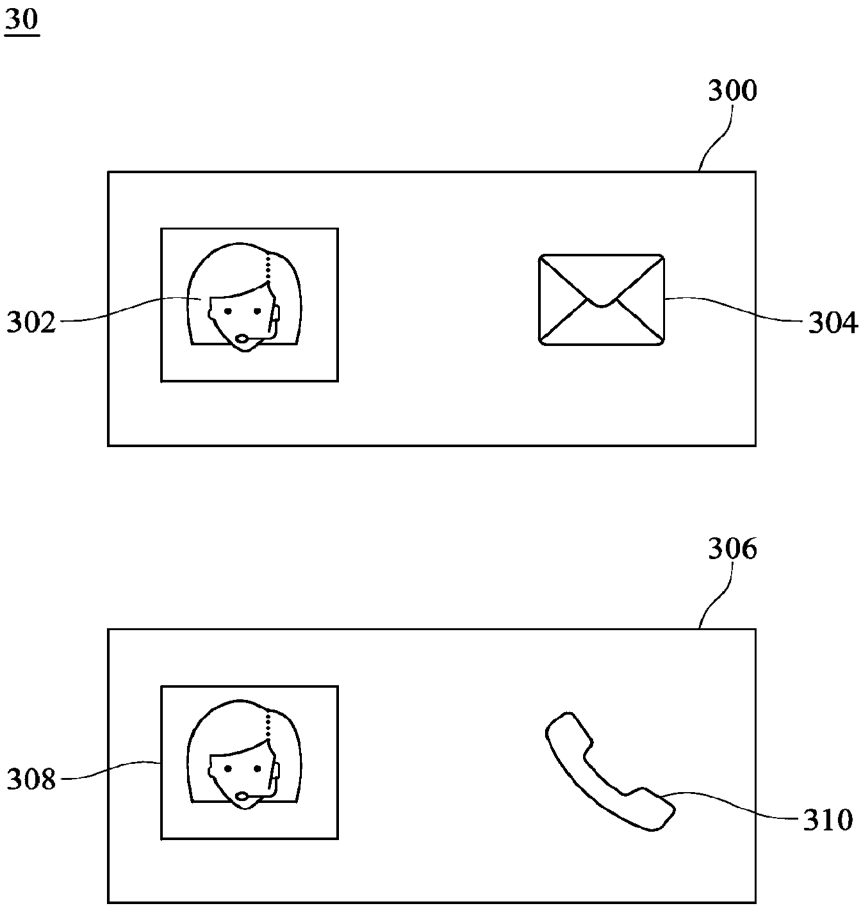
FIG. 3A illustrates an embodiment 30 of a user interface showing a mobile secretary cloud application operating another software application, according to an embodiment.

FIG. 3A demonstrates an embodiment 30 of software program product user interfaces 300 and 306 in accordance with the invention as a screen shot diagram. The user interfaces show the mobile secretary cloud application 302, 308 operating another software application. The user interfaces could be displayed for example on a display screen of a mobile client device i.e. a smartphone.

The software program product is stored on a non-transient memory medium i.e. the memory 208 of the system i.e. mobile client device 200 and the cloud server 216. The software program product may also be distributed between the memory 208 of the mobile client device 200 and the cloud server 216, so that some parts of the software program product reside in the memory 208 and some parts of the software program product reside on the cloud server 216.

In an embodiment, a software program product user interface 300 is shown to comprise a mobile secretary cloud application 302 operating another software application i.e. a messaging application 304. The mobile secretary cloud application 302 reads data from the messaging application 304 and operates the messaging application 304 based on read data. The read data may include contents of messages, details of senders of the messages, date and time of receipt of the messages etc. All such details may be processed using AI and accordingly, the messaging application may be operated. In one case, a message may be received from a colleague and the message may ask a user to call his colleague. During such instance, if it is determined that the user is driving a vehicle, the messaging application may automatically answer to the message that the user is driving and that the user shall get in touch after a few minutes. The user driving the vehicle could be determined based on accelerometer data of the mobile client device of the user or based on a driving mode set by the user on the mobile client device or from location changes of the mobile client device based on GPS or base station measurements. Similarly, it is also possible to use images of emails to determine their type and characteristics as explained before.

In an embodiment, a software program product user interface 306 is shown to comprise a mobile secretary cloud application 308 operating another software application i.e. a calling application 310. The mobile secretary cloud application 308 may interact with the calling application 310 on user's behalf. In one case, the calling application 310 may be connected to an Interactive Voice Response System (IVRS) for booking flight tickets for the user. The mobile secretary cloud application 308 may utilize AI for analyzing all instructions received via the IVRS. For example, the user may be required to set a preferred communication language over the IVRS by pressing of a soft key. The mobile secretary cloud application 308 may determine English as preferred communication language of the user, based on previous communication of the user over calls, language of content present in message, mails, etc. In one case, the mobile secretary cloud application may analyze user's interaction with the IVRS over several calls, to learn user's preferences and other user data provided by the user, over the IVRS. The other user data may comprise personal details, payment details, and details for user identity verification. Successively, the mobile secretary cloud application 308 may respond to select English as the preferred language of the user by selecting the soft key assigned to English. Thereafter, the mobile secretary cloud application 308 may provide other inputs to the IVRS, such as providing personal details of the user, answering to authentication questions for the user, and selecting a particular department to be contacted via the IVRS either by emulating soft key presses, or reading out answers with synthesized voice down the phone line. Thus, taking the burden of interacting with the IVRS, or a human service agent, when the answer to the question asked by the IVRS or the human service agent is known.

In one preferred embodiment, the mobile secretary application gets a human service agent on the line. Remember in the old times, when secretaries would get people "on the line", i.e. waiting to the telephone for the CEO?—The mobile secretary cloud application can do that for the normal consumer. The mobile secretary cloud application 308 simply navigates through the choices of the IVRS with selections that deviate the least from past selections of the user or users that have been recorded. Further, the mobile secretary cloud application may identify questions asked by the human service agent, such as "What is your Date of Birth?" or "What is your Customer number?", and subsequently voice recognize these questions, and then dictate the date of birth of the user, or the customer number of the user down the phone line with synthesized voice.

Similarly to before, a training set of maybe 30,000 IVRS discussions can be created. The mobile secretary cloud application and cloud network is then taught with 5000 IVRS validation set discussions, what is a satisfactory conduct of the IVRS discussion. Typically, this is the IVRS discussion that deviates the least from the facts available to the mobile secretary cloud application, and the mobile secretary cloud application will attempt to conduct that IVRS discussion with a computer or a human service agent on behalf of the user via the phone line to as far as possible. When the mobile secretary cloud application can no longer determine a satisfactory response, it may consult the user or direct that part of the interaction to the human user so that he may conduct that part of the interaction himself. The mobile secretary cloud application may also contain goal based standard call & discussion protocols, for example "get window seats for flight". When selected, the mobile secretary cloud application calls the airline with the booking reference obtained from the emails, and conducts the discussion with soft keys or synthesized voice to obtain a window seat for the user. If that does not work, the mobile secretary cloud application 302, 308, 314 may automatically try to obtain the window seat via airline webpages by filling on-line forms of the airline or an online travel agent, and optionally purchasing tickets thereby with the user's credit card details stored in the cloud network or the mobile terminal. Of course, the order in which the call and the website are used could be reversed: the mobile secretary cloud application could try first to obtain the window seat via the webpage, but if that does not work it could call the airline as explained before to obtain a window seat. For activities like this separate training sets and validations sets could be configured, for example by recording 30,000 phone conversations where a window seat is obtained, or by recording 30,000 web sessions where a window seat is obtained.

However, the sizes of both the training set and validation can be grown to much higher sample numbers. Especially if the quality of the samples is poor and/or the data samples are small are higher numbers preferable. It is known from A. Halevy, P. Norvig and F. Pereira The Unreasonable Effectiveness of Data, IEEE Intelligent Systems 8-12, 2009 that a trillion messy data samples may be more useful in machine learning than a clean data set of million items. This document is cited here as reference. It is in accordance with some embodiments of the invention to use sample set sizes in the millions, billions and trillions of samples.

Any features of embodiment 30 may be readily combined or permuted with any of the other embodiments 10, 11, 20, 31, 40, 41, 50, 60, 61, 62, 63, 71, 81, and/or 82 in accordance with the invention.

Figure 3B:
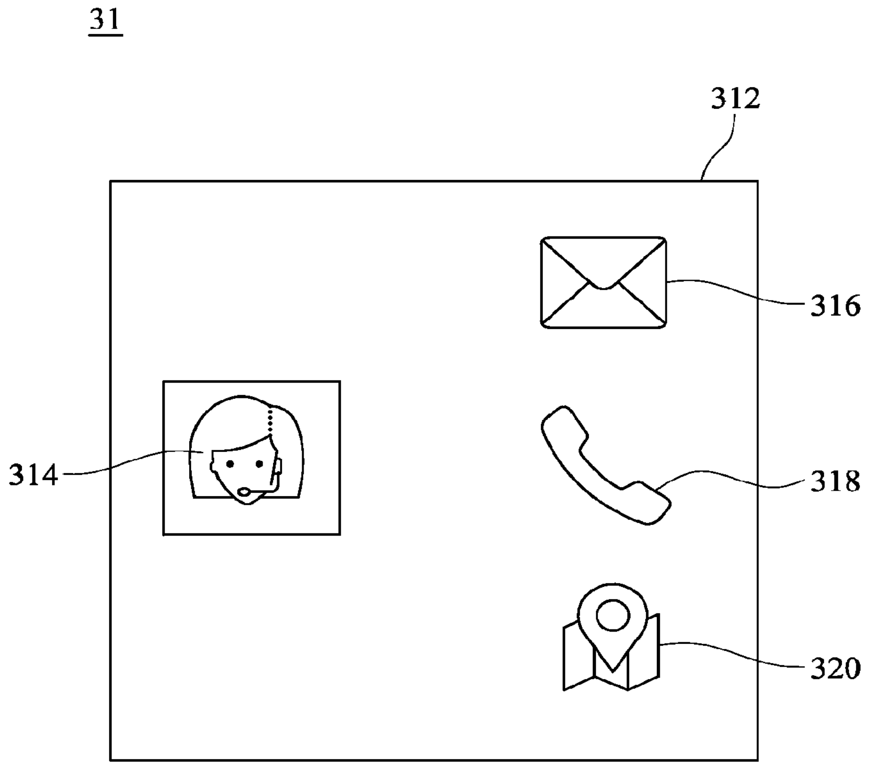
FIG. 3B illustrates an embodiment 31 of a user interface showing a mobile secretary cloud application utilizing another software application for operating a third software application, according to an embodiment.

FIG. 3B demonstrates an embodiment 31 of a software program product user interface 312 in accordance with the invention as a screen shot diagram. The user interface 312 shows the mobile secretary cloud application 314 utilizing another software application for operating a third software application. The user interface could be displayed for example on a display screen of a mobile client device i.e. a smartphone.

In an embodiment, a software program product user interface 312 is shown to comprise a mobile secretary cloud application 314 utilizing another software application for operating the third software application, where another software application and the third software application is selected from a messaging application 316, a calling application 318, and a map application 320. In one embodiment, the mobile secretary cloud application 314 accesses data present in the messaging application 316 for operating the calling application 318. For example, the messaging application may comprise a message including calling details of an Air Conditioning (A.C.) repairing agency. Upon retrieving such details from the message, the mobile secretary cloud application 314 may automatically call the A.C. repairing agency and may answer to an IVRS system over the call, for arranging repair of the A.C. In another case, the messaging application may comprise another message including details of a venue for attending a meeting by the user. Based either on a user's request or automatically, on the date of the meeting, the mobile secretary cloud application 314 may operate the map application 320 for setting a navigation path, to guide the user for reaching the venue of meeting. In some embodiments this navigation path is sent to a self-driving car configured to transport the user.

Any features of embodiment 31 may be readily combined or permuted with any of the other embodiments 10, 11, 20, 30, 40, 41, 50, 60, 61, 62, 63, 71, 81, and/or 82 in accordance with the invention.

Figure 4A:
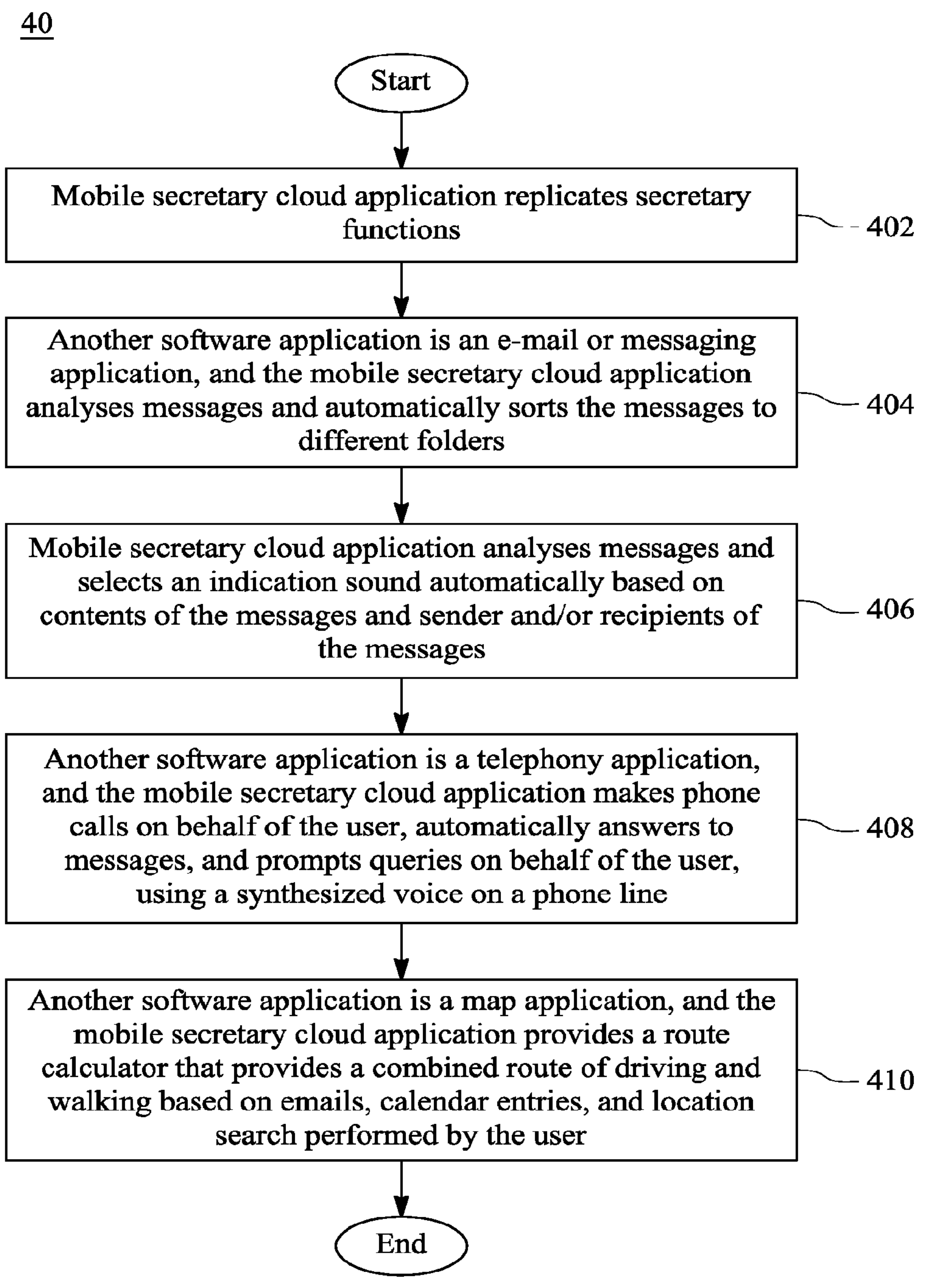
FIG. 4A illustrates an embodiment 40 of a flow chart showing a method of implementation of a mobile secretary cloud application for operating several other software applications, according to an embodiment.

FIG. 4A illustrates an embodiment 40 of a flow chart showing a method of implementation of a mobile secretary cloud application for operating several other software applications. The different phases/steps mentioned in FIG. 4*a* are not necessarily performed in mentioned sequence, but could be performed in different sequences or independently.

Figure 5:
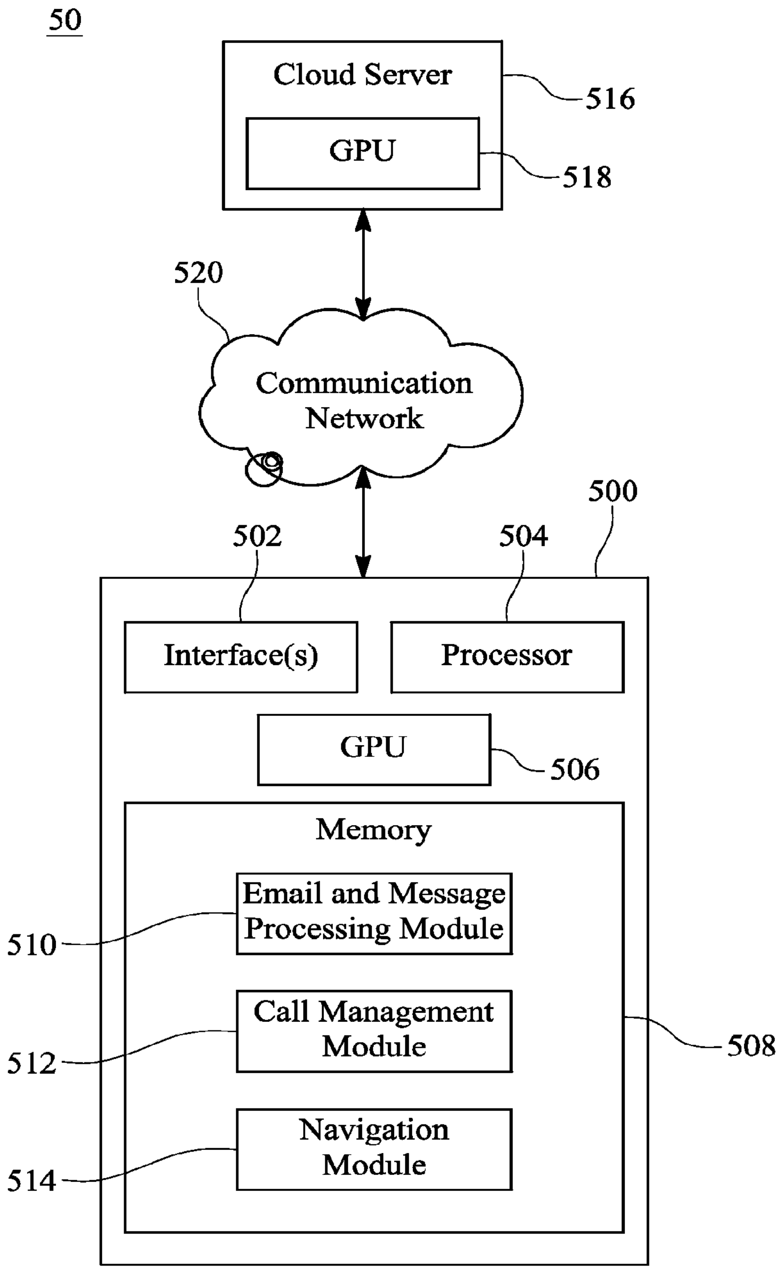
FIG. 5 illustrates an embodiment 50 of a block diagram of a system executing a mobile secretary cloud application.

FIG. 5 illustrates an embodiment 50 of a block diagram of a system 500 executing the mobile secretary cloud application. The system comprises interface(s) 502, processor 504, Graphical Processing Unit (GPU) 506, and memory 508. The memory 508 comprises a mail and message processing module 510, a call management module 512, and a navigation module 514. In an embodiment, the system 500 is integrated with a cloud server 516, via a communication network 520. The cloud server 516, the GPU 518, and the communication network 520 are similar to the cloud server 216, GPU 218, and the communication network 220 of FIG. 2 respectively. Different phases of FIG. 4A are now explained in conjunction with modules of FIG. 5.

Any features of embodiment 50 may be readily combined or permuted with any of the other embodiments 10, 11, 20, 21, 30, 31, 40, 41, 60, 61, 62, 63, 71, 81 and/or 82 in accordance with the invention.

In phase 402, the mobile secretary cloud application replicates secretary functions i.e. the mobile secretary cloud application performs tasks for the user and/or provides assistance to the user in managing tasks by operating other software application(s) installed on the mobile client device like a human secretary would.

In phase 404, another software application is an e-mail or messaging application 604. The e-mail and message processing module 510 of the mobile secretary cloud application 602 or the GPU 506, 518 and/or processor 504 analyses messages and e-mails, and automatically sorts the messages and e-mails into different folders. Analysis of the messages and e-mails may be performed by utilizing AI, that processes contents of the messages and e-mails and other information related to the messages and e-mails, for sorting the messages and e-mails into different folders 606*a*-606*c*. The artificial intelligence can be realized by teaching the mobile secretary cloud application to distinguish an email from the image of the email, with training sets and validations sets of images of emails for example as explained before. Alternatively or additionally, the AI can classify an email based on metadata and semantic content, in which case a training set of emails and validations set of emails would be used so, that the artificial intelligence secretary application is taught to classify emails based on their semantic content, and metadata, such as time, recipient, sender and the like. Further these two AI methods can be used together in a mix.

In phase 406, the e-mail and message processing module 510 or the GPU 506, 518 and/or processor 504 analyses messages and selects an indication sound (amongst 616*a*-616*c*) automatically based on classification, contents of the messages and sender and/or recipients of the messages. The e-mail and message processing module 510 or the GPU 506, 518 and/or processor 504 may utilize AI to process contents of the messages and may select an indication sound based on the contents. For example, the mobile client device of the user may receive a pleasant message, stating "You did an incredible job." Similarly, the user may receive other pleasant messages, such as "Thank you for your kind support," "I am glad to hear about your promotion," and "love you my son." The e-mail and message processing module 510 or the GPU 506, 518 and/or processor 504, utilizing AI, may learn upon analyzing semantically several such messages, and may determine that such messages convey pleasant gestures.

The e-mail and message processing module 510 or the GPU 506, 518 and/or processor 504 may be taught to learn or know the semantic meanings of words present in the e-mails and messages. For example, in one embodiment, the words "incredible," "thank you," "kind," "glad," "promotion," and "love" infer pleasant gestures from a sender, and the e-mail and message processing module 510 or the GPU 506, 518 and/or processor 504 may associate a positive meaning to such words. Based on such learning, the e-mail and message processing module 510 or the GPU 506, 518 and/or processor 504 may play uplifting and positive audio as the indication sound.

In a contrasting case, the mobile client device of the user may receive a harsh message, stating "poor job." Similarly, the user may receive other harsh messages, such as "you've passed the deadline," "I won't tolerate such careless attitude," and "hate you." The e-mail and message processing module 510 or the GPU 506, 518 and/or processor 504 utilizing AI, may learn upon several such messages, and may determine that such messages convey harsh and negative gestures. The e-mail and message processing module 510 or the GPU 506, 518 and/or processor 504 may be taught to attribute a negative meaning to these words present in the e-mails and messages. For example, in the present embodiment, the words "poor," "passed deadline," "won't tolerate," and "hate" infer harsh and negative gestures from a sender, and the e-mail and message processing module 510 using the GPU 506, 518 and/or processor may be taught to know or learn such semantic meaning. Based on such learning or knowledge, the e-mail and message processing module 510 or the GPU 506, 518 and/or processor 504 may play a loud beep or warning signal as the indication sound.

Further, the e-mail and message processing module 510 or the GPU 506, 518 and/or processor 504 may also derive meanings based on analysis of smileys/emoticons and special characters present in the e-mails and messages. The special characters may include "!!," "?" and other known special characters. For example, the user may receive a message stating "you again!!" or "what have you done?" The e-mail and message processing module 510 or the GPU 506, 518 and/or processor 504 may learn and/or distinguish the delivery of a harsh gesture through such message. Based on such learning, the e-mail and message processing module 510 or the GPU 506, 518 and/or processor 504 may play a warning sound or a loud beep as the indication sound.

In phase 408, another software application is a telephony application 626. Using the telephony application 626, the call management module 512 of the mobile secretary cloud application 622 or the GPU 506 and/or 518 may make phone calls on behalf of the user, may automatically answer to messages or compose draft replies, and may answer to incoming calls on behalf of the user, and may prompt queries and answer to queries on behalf of the user, using a synthesized voice on a phone line. For example, during an IVRS phone call the user's phone number and customer number may be asked. The call management module 512 or the GPU 506, 518 and/or processor 504 may recognize the asked questions by voice recognition software and provide answers to the recognized questions based on previous calls or data available in the emails, messages, or the filesystem, and may respond to the IVRS or customer attendant in the call center by reading the information using synthesized voice.

In another embodiment, the user may need to book flight tickets from Mumbai, India to New York, United States and details of such journey may be stored in an e-mail or message. Based on approval of the user or automatically, the mobile secretary cloud application 622 accesses such details for booking the flight tickets for the user. The call management module 512 or the GPU 506 and/or 518 may call a customer care number of an airline, use a voice synthesizer to read out and voice recognition software to recognize details for communicating over the call, and thus book the flight tickets over the phone.

In phase 410, another software application is a map application 634. The navigation module 514 of the mobile secretary cloud application 632 using the GPU 506, 518 and/or processor 504 using the map application 634 provides a route calculator that provides a combined route of driving and walking based on e-mails, calendar entries, and location search. The navigation module 514 or the GPU 506, 518 and/or processor 504 upon accessing data present in the e-mails and the calendar entries may determine a date and time of reaching a location by the user. The navigation module 514 or the GPU 506, 518 and/or processor 504 may determine multiple routes for reaching the location. Further, the navigation module 514 or the GPU 506, 518 and/or processor 504 may access recent location searches performed by the user, and may utilize such information for filtering the multiple routes. In one case, the navigation module 514 or the GPU 506, 518 and/or processor 504 may provide the user with a route which is most familiar to the user, i.e. the user has been through at least once.

Figure 2A:
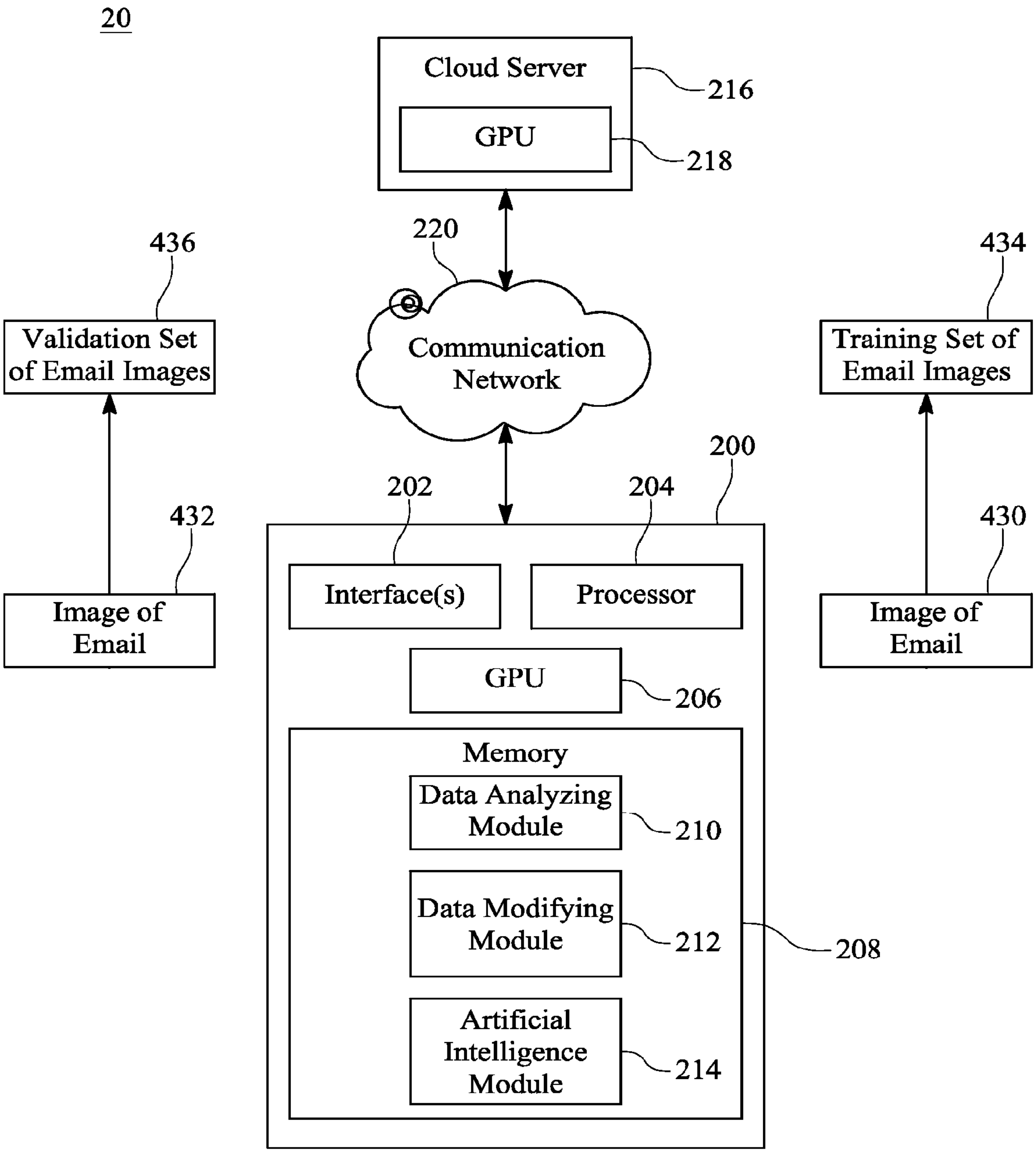
FIG. 2A illustrates an embodiment 20 of a block diagram of a system 200 for executing a mobile secretary cloud application, according to an embodiment.
Figure 2B:
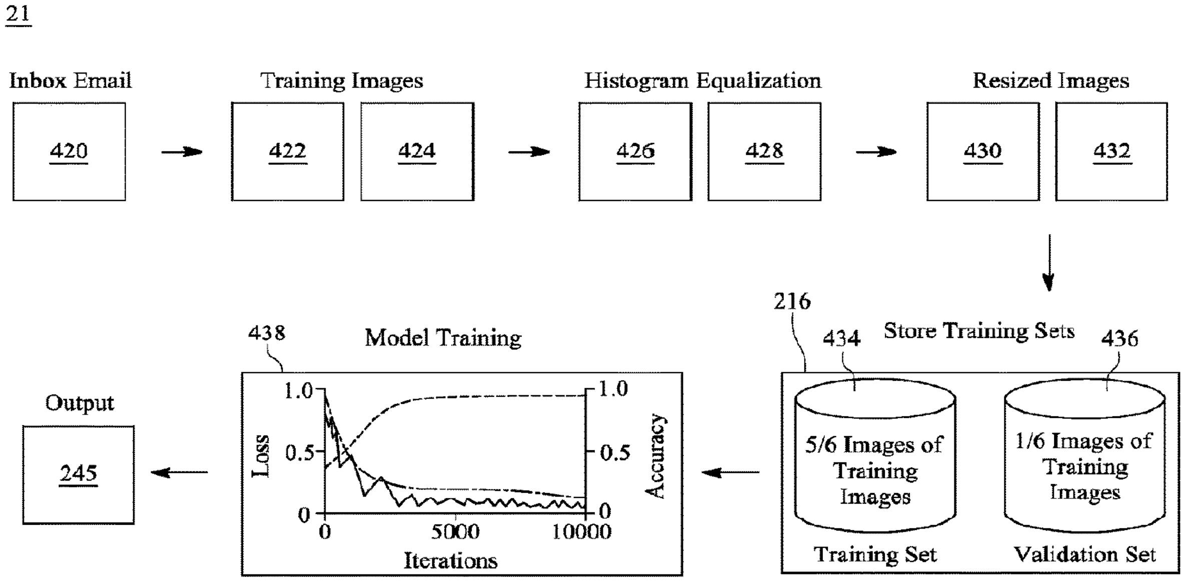
FIG. 2B illustrates a machine learning embodiment 21 where artificial intelligence is used to distinguish legitimate business emails from spam emails and other emails.

The method explained with Graph 438 in FIGS. 2A and 2B and elsewhere earlier in the description can be used with all third applications e-mail 510, calls 512, navigation 514. The mobile secretary cloud application and cloud server 516 is first provided with a large training set, spanning the diversity of emails, phone conversations, or navigation routes. The mobile secretary cloud application is then taught with a validation set of emails, phone conversations or navigation routes what is an acceptable choice for a user. Once the error rate is diminished below a threshold with a large number of iterations as shown in graph 438 of FIG. 2B, the model is deployed to users. Naturally machine learning files can be continuously maintained, updated and improved on the cloud server network 516 from which the machine learning files and their updates are made available to the terminal devices 200, 500.

Any features of embodiment 40 may be readily combined or permuted with any of the other embodiments 10, 11, 20, 21, 30, 31, 41, 50, 60, 61, 62, 63, 71, 81, and/or 82 in accordance with the invention.

Figure 4B:
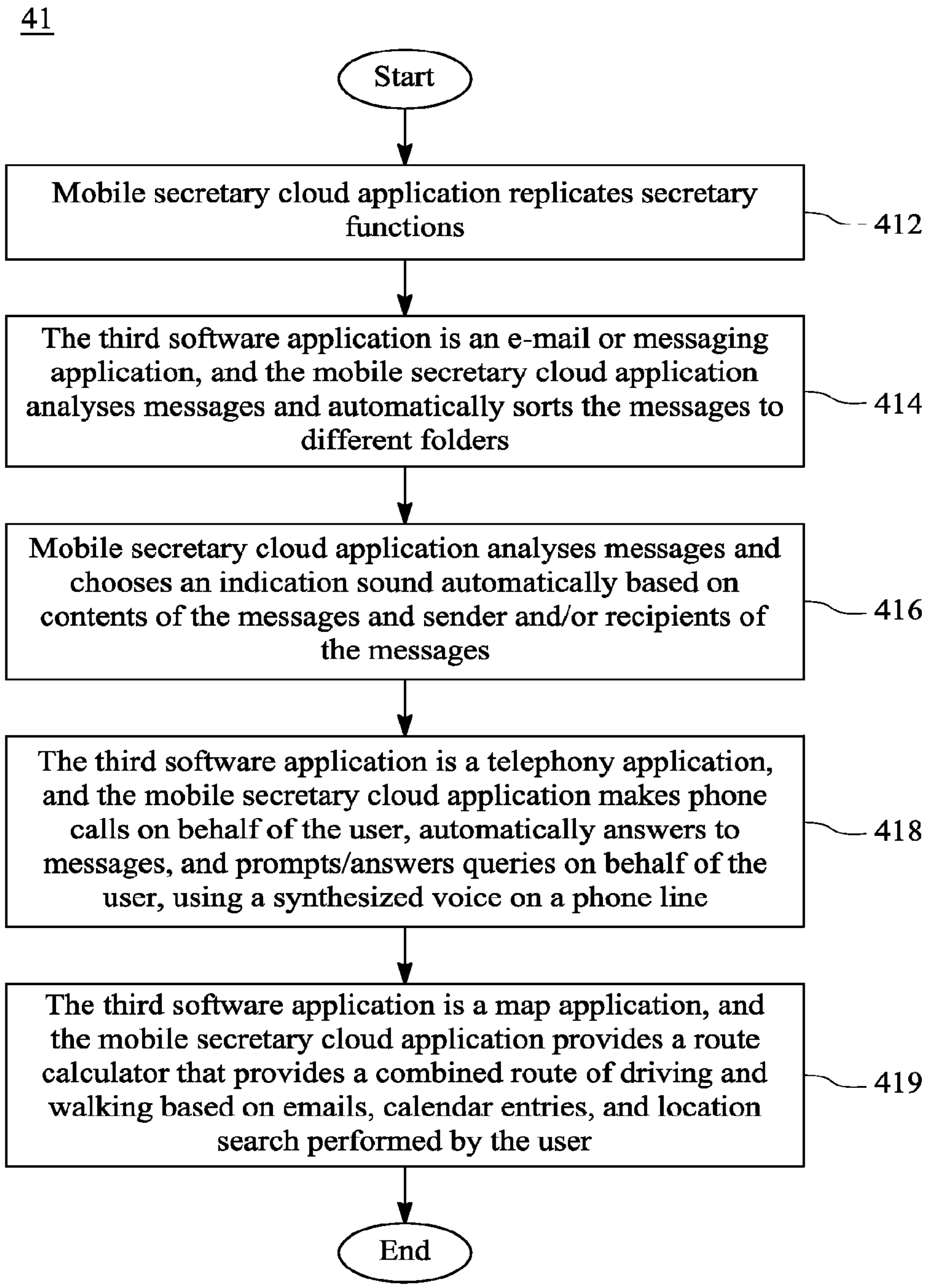
FIG. 4B illustrates an embodiment 41 of a flow chart showing a method of implementation of a mobile secretary cloud application for operating several third software applications, using another software application, according to an embodiment.

FIG. 4*b* illustrates a flow chart showing a method of implementation of a mobile secretary cloud application for operating several third software applications, using the intelligent secretary software application, according to some embodiments of the invention. The different phases/steps mentioned in FIG. 4*b* are not necessarily performed in mentioned sequence, but could be performed in different sequences or independently. Different phases of FIG. 4*b* are now explained in conjunction with modules of FIG. 5.

In phase 412, the mobile secretary cloud application replicates secretary functions i.e. the mobile secretary cloud application performs tasks for the user and/or provides assistance to the user in managing tasks by operating software application(s) installed on the mobile client device like a professional secretary would.

In phase 414, the third software application operated by the mobile secretary cloud application 602 is an e-mail or messaging application 604. The e-mail and message processing module 510 or the GPU 506, 518 and/or processor 504 of the mobile secretary cloud application 602 analyses messages and automatically sorts the messages to different folders 606*a*-606*c* shown in FIG. 6A. Along with information present in the messages and e-mails, the e-mail and message processing module 510 or the GPU 506, 518 and/or processor 504 may utilize data of another application, for example a calendar application, for sorting the messages and e-mails to different folders 606*a*-606*c*. In one embodiment the folders 606*a*-606*c* have different urgency levels, like one day, one week, one month and so on. The mobile secretary cloud application moves the emails to the different folders 606*a*-606*c* and in between the folders 606*a*-606*c* as the emails become more or less urgent, as new entries are marked into the calendar, and so forth.

In phase 416, the e-mail and message processing module 510 or the GPU 506, 518 and/or processor 504 analyses messages and selects an indication sound (amongst 616*a*-616*c*) automatically based on contents of the messages and sender and/or recipients of the messages. In one case, the e-mail and message processing module 510 or the GPU 506, 518 and/or processor 504 may utilize AI to process contents of the messages and may select an indication sound based on the contents, or the folder to which the message is classified.

In phase 418, the third software application is a telephony application 626. Using the telephony application 626, the call management module 512 or the GPU 506, 518 and/or processor 504 of the mobile secretary cloud application 622 makes phone calls on behalf of the user, may automatically answer to messages or incoming phone calls, and may answer to queries on behalf of the user, using a synthesized voice on the phone line. For example, during an IVRS phone call the user's phone number and customer number may be asked. The call management module 512 may recognize the question by voice recognition software and find requested information in a digital wallet of the user or other application storing such detail, and may respond on the IVRS by reading the information using the synthesized voice. In another embodiment, the user may need to book flight tickets from Mumbai to New York and details of such journey may be stored in an e-mail or message. Based on approval of the user, the call management module 512 or the GPU 506, 518 and/or processor 504 access such details for booking the flight tickets for the user. The call management module 512 or the GPU 506, 518 and/or processor 504 for example calls a customer care number of an airline, uses a voice synthesizer to read such details for communicating over the call, and thus books the flight tickets. Alternatively, the mobile secretary cloud application may be configured to operate an e-commerce application to book the flights. The acceptable flight or acceptable flights for purchase can be determined as explained before, by providing a training set and validation set of flights and teaching the mobile secretary cloud application to select an acceptable flight that, for example deviates from the model acceptable flight the least in a number of parameters such as duration, price, departure and arrival time and/or stopover duration.

In phase 419, the third software application is a map application 634. The navigation module 514 of the mobile secretary cloud application or the GPU 506, 518 and/or processor 504 using the map application provides a route calculator that provides a combined route of driving and walking based on e-mails, calendar entries, and location search performed by the user for conducting the activities of the day at various locations and times. The navigation module 514 or the GPU 506, 518 and/or processor 504 upon accessing data present in the e-mails 636 and the calendar entries 638 may determine a date and time of reaching a location by the user. The mobile secretary cloud application may determine multiple routes for reaching the location. Further, the navigation module 514 or the GPU 506, 518 and/or processor 504 may access recent location searches 640 performed by the user, and may utilize such information for filtering the multiple routes. In one case, the navigation module 514 or the GPU 506, 518 and/or processor may provide the user with a route which is most familiar to the user, or which route when followed allows the user to complete the maximum number of errands or tasks on his to do list.

The aforementioned secretarial process of optimizing routes, agendas and/or timetables naturally results in the knowledge of events that the user has actually visited. The location and time of the mobile station can be followed and calendar entries and Internet search can be harnessed along with call application data to construct a history of events that the user has attended. Many of these events are likely to be recurring: conferences happen every year, the barber has to be visited once per month, the dentist once per year, the accountant needs to be contacted every 3 months to prepare a quarterly report and so forth. The mobile secretary cloud application can automate the rebooking of the user into these events. In the first stage, the mobile secretary cloud application 602, 612, 622, 632 may populate the calendar with entries when the event takes place or should take place. The mobile secretary cloud application 602, 612, 622, 632 may search the Internet to determine the 2019 dates of a conference that the user attended in 2018, and mark them up in the calendar. The Mobile secretary cloud application 602, 612, 622, 632 may also register the user to this conference automatically or upon approval of the user. The mobile secretary cloud application may book barber and dentist appointments at a convenient time and place automatically or upon approval of the user as explained before via phone or the webpage of the barber or dentist. All of these activities can be done without or almost without any user participation by the mobile secretary cloud application merely repeating recorded telephone conversations or webpage sessions and adapting them with AI to the current or upcoming situation. If plans change the mobile secretary cloud application 602, 612, 622, 632 may automatically cancel activities or events on behalf of the user, by similarly executing web sessions or phone conversations of cancellation on behalf of the user, adapted with AI to the current situation.

Any features of embodiment 41 may be readily combined or permuted with any of the other embodiments 10, 20, 21, 30, 31, 40, 50, 60, 61, 62, 63, 71, 81, and/or 82 in accordance with the invention.

Figure 6A:
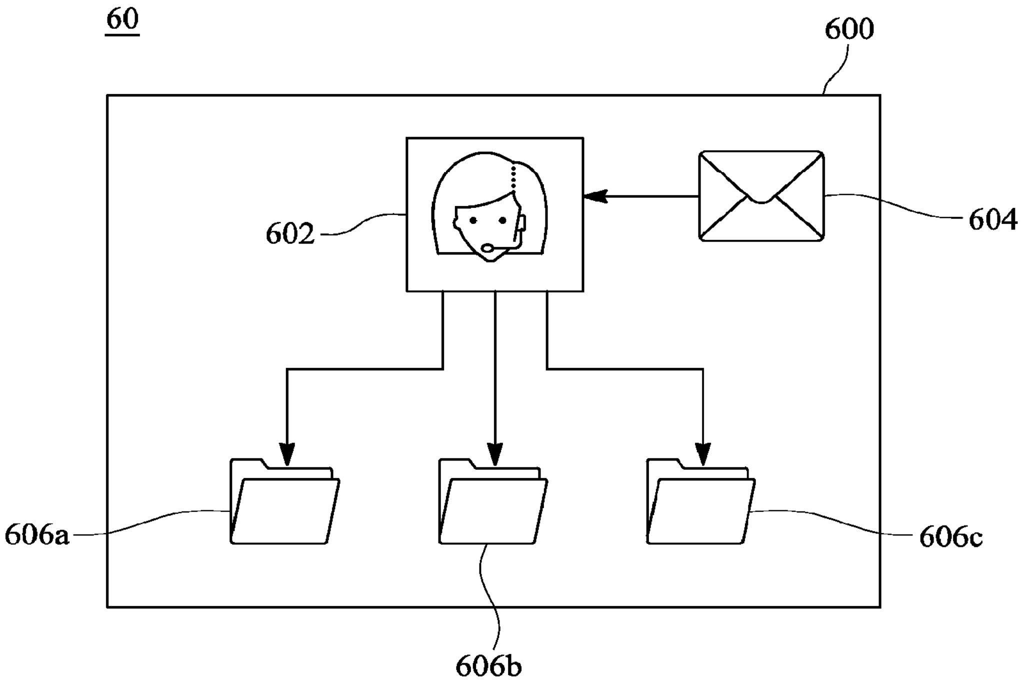
FIG. 6A illustrates an embodiment 60 of a user interface showing a mobile secretary cloud application operating an e-mail/messaging application.

FIG. 6A demonstrates an embodiment 60 of a software program product user interface 600 in accordance with the invention as a screen shot diagram. The user interface 600 shows the mobile secretary cloud application 602 operating an e-mail/messaging application 604. The user interface 600 could be displayed for example on a display screen of the mobile client device i.e. a smartphone 500.

In an embodiment, the software program product user interface 600 is shown to comprise the mobile secretary cloud application 602 operating the e-mail/messaging application 604. The mobile secretary cloud application 602 reads data from the e-mail/messaging application 604 and operates the e-mail/messaging application 604 based on read data. The read data may include contents of messages, details of senders of the messages, date and time of receipt of the messages etc. All such details may be processed using AI and accordingly, the messaging application may be operated. In one case, based on processing of the read data, the mobile secretary cloud application 602 may store official work-related mails and messages into folder 606*a*, *e*-mails and messages from friends and families into folder 606*b*, and other e-mails and messages, such as from banks, telecom operators, and other service providers into folder 606*c*. For example, the messages and e-mails may be sorted into different folders based on the senders, month of receipt, and details of the messages/e-mails. The mobile secretary cloud application may also take images or photographs of the emails to graphically process the emails as explained before in association with FIGS. 2A and 2B. Similarly, the photographic/visual classification of e-mails or messages may be done together with the semantic classification so that these two methods are used in a mix. It is also in accordance with some embodiments of the invention for the mobile cloud secretary application to search the Internet to gain further information about sender, recipient or the like to assist in the message and/or email classification.

Any features of embodiment 60 may be readily combined or permuted with any of the other embodiments 10, 11, 20, 21, 30, 31, 40, 41, 50, 61, 62, 63, 71, 81, and/or 82 in accordance with the invention.

Figure 6B:
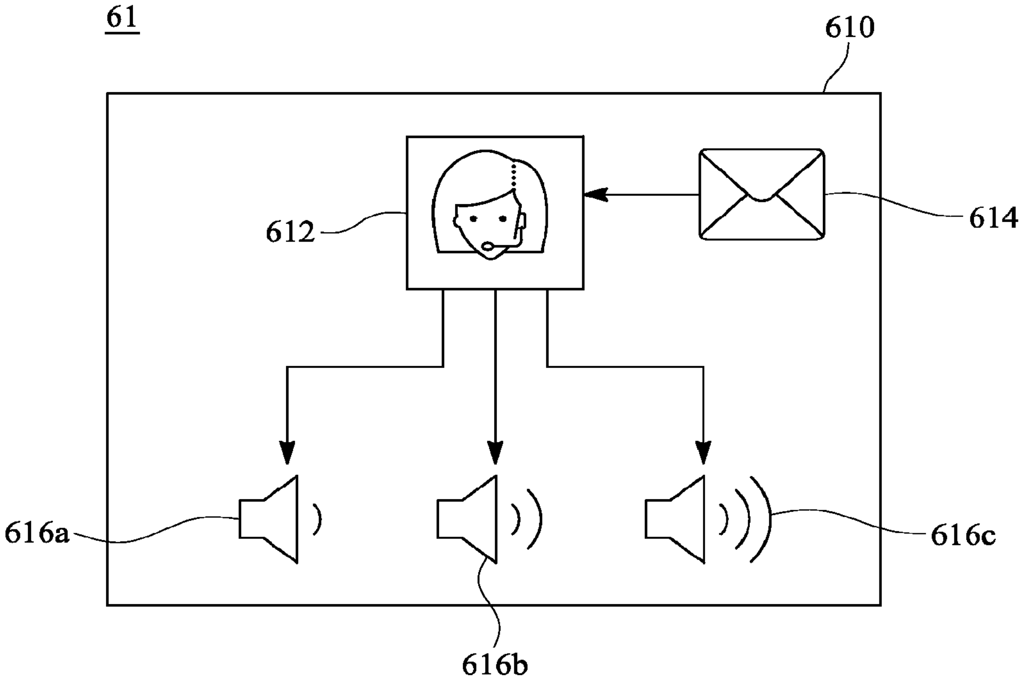
FIG. 6B illustrates an embodiment 61 of a user interface showing a mobile secretary cloud application operating an e-mail/messaging application.

FIG. 6B demonstrates an embodiment 61 of a software program product user interface 610 in accordance with the invention as a screen shot diagram. The user interface 610 shows the mobile secretary cloud application 612 operating an e-mail/messaging application 614. The user interface 610 could be displayed for example on the display screen of the mobile client device i.e. a smartphone.

In an embodiment, the software program product user interface 610 is shown to comprise the mobile secretary cloud application 612 operating the e-mail/messaging application 614. The mobile secretary cloud application 612 analyses messages and selects an indication sound automatically based on contents of the messages and sender and/or recipients of the messages. In one case, the e-mail and message processing module 510 or the GPU 506, 518 and/or processor 504 utilizes AI to process contents of the messages and selects an indication sound based on the contents. For example, the mobile client device of the user may receive a pleasant message, stating "You did an incredible job." Similarly, the user may receive other pleasant messages, such as "Thank you for your kind support," "I am glad to hear about your promotion," and "love you my son." The e-mail and message processing module 510 or the GPU 506, 518 and/or processor 504, utilizing AI, may be taught that the semantic meaning of such messages convey pleasant gestures. The e-mail and message processing module 510 or the GPU 506, 518 and/or processor 504 may also continuously learn and update machine learning files, or deep learning files or Artificial Intelligence files on the terminal or in the cloud, based on processing of words present in the e-mails and messages. Typically, in some embodiments these machine learning files, or deep learning files or Artificial Intelligence files contain training set and/or validation set data. For example, in present embodiment, the words "incredible," "thank you," "kind," "glad," "promotion," and "love" infer pleasant gestures from a sender, and the e-mail and message processing module 510 or the GPU 506, 518 and/or processor may learn such meaning, and/or attribute such semantic meaning to these words. Based on such learned or attributed meaning, the e-mail and message processing module 510 or the GPU 506, 518 and/or processor 504 may play a positive and uplifting audio 616*a* with a loudspeaker as the indication sound.

It is in accordance with some embodiments of the invention to have the Artificial intelligence files used to train and validate the Artificial Intelligence process on the terminal, in the cloud and/or distributed between both of them. Artificial intelligence files, deep learning files, machine learning files and self-learning files are used interchangeably, and refer to the files used to establish the training and validation process producing the artificial intelligence as explained before for example with FIG. 2B.

In a contrasting case, the mobile client device of the user may receive a harsh message, stating "poor job." Similarly, the user may receive other harsh messages, such as "you've passed the deadline," "I won't tolerate such careless attitude," and "hate you." The e-mail and message processing module 510 or the GPU 506 and/or 518, utilizing AI, may learn upon several such messages, and may determine that such messages convey dissatisfaction from the sender. The e-mail and message processing module 510 or the GPU 506, 518 and/or processor 504 may also continuously learn based on processing of words present in the e-mails and messages, and update the machine learning files on the terminal device and/or the cloud server. For example, in present case, the words "poor," "passed deadline," "won't tolerate," and "hate" infer dissatisfaction from a sender, and the e-mail and message processing module 510 or the GPU 506, 518 and/or processor may know, or learn such meaning. Based on such learning or knowing the semantic meaning, the e-mail and message processing module 510 using the GPU 506, 518 and/or processor 504 may play a loud beep 616*b* or warning sound as the indication sound with a loudspeaker.

Further, the e-mail and message processing module 510 or the GPU 506, 518 and/or processor 504 may also derive meanings based on analysis of smileys/emoticons and special characters present in the e-mails and messages. The special characters may include ☺ "!!," "?" and other known special characters or emoticons. For example, the user may receive a message stating "you again!!" or "what have you done?" The e-mail and message processing module 510 or the GPU 506, 518 and/or processor may learn delivery of harsh gesture through such message, or a positive gesture if the emoticon has a positive semantic meaning. Based on such knowing or learning, the e-mail and message processing module 510 or the GPU 506, 518 and/or processor 504 may play a positive uplifting signal for positive emoticons and a negative audio signal such as a loud beep 616*b* as the indication sound for negative emoticons. Similarly, other indication sounds 616*c* may be used for different special characters or emoticons indicating other expressions and/or gestures included in the e-mails and/or messages received by the user.

Any features of embodiment 61 may be readily combined or permuted with any of the other embodiments 10, 11, 20, 21, 30, 31, 40, 41, 50, 60, 62, 63, 71, 81, and/or 82 in accordance with the invention.

Figure 6C:
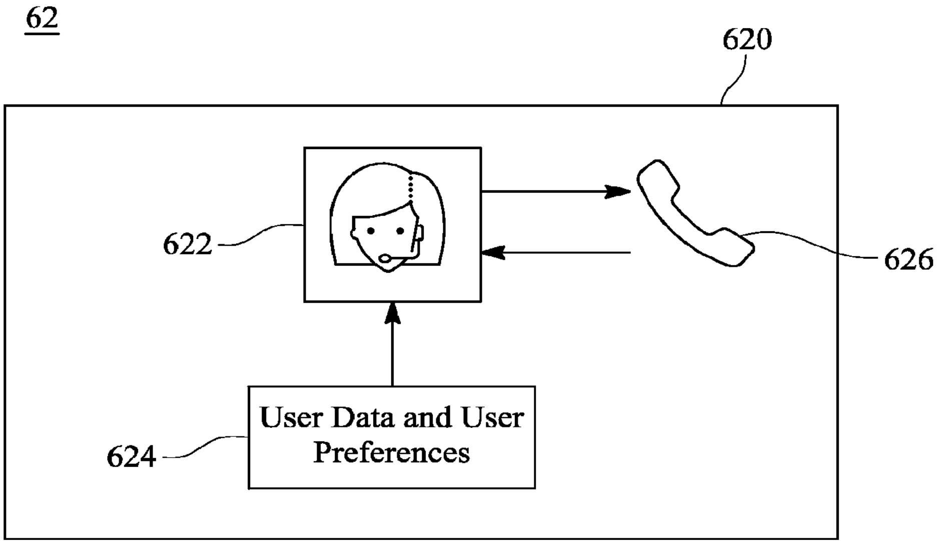
FIG. 6C illustrates an embodiment 62 of a user interface showing a mobile secretary cloud application operating a telephony application.

FIG. 6C demonstrates an embodiment 62 of a software program product user interface 620 in accordance with the invention as a screen shot diagram. The user interface 620 shows the mobile secretary cloud application 622 operating the calling application 626. The user interface 620 could be displayed for example on the display screen of the mobile client device i.e. a smartphone.

In an embodiment, the software program product user interface 620 is shown to comprise the mobile secretary cloud application 622 operating a calling application 626. The mobile secretary cloud application 622 may interact with the calling application 626 on user's behalf. In one case, the calling application 626 may be connected to an Interactive Voice Response System (IVRS) for bookings flight tickets for the user. The mobile secretary cloud application 622 may utilize AI for analyzing all instructions or voice prompts received via the phone line from the IVRS. For example, the user may be required to set a preferred communication language over the IVRS by pressing of a soft key or number key. The mobile secretary cloud application 622 may determine English as preferred communication language of the user, based on user data and user preferences 624 of the user. Successively, the mobile secretary cloud application 622 may respond to select English as preferred language of the user. Thereafter, the mobile secretary cloud application 622 may provide other inputs to the IVRS, such as providing personal details of the user, answering to authentication questions for the user, and selecting a particular department to be contacted via the IVRS. The mobile secretary cloud application 622 may retrieve all required information from the user data and user preferences 624 of the user. For example, the user data may comprise travelling details, personal details and payment details of the user. Thus, the mobile secretary cloud application 622 may provide the travelling details over the IVRS and may finally provide the payment details, over the IVRS, for booking a flight ticket for the user.

Any features of embodiment 62 may be readily combined or permuted with any of the other embodiments 10, 11, 20, 21, 30, 31, 40, 41, 50, 60, 61, 63, 71, 81, and/or 82 in accordance with the invention.

Figure 6D:
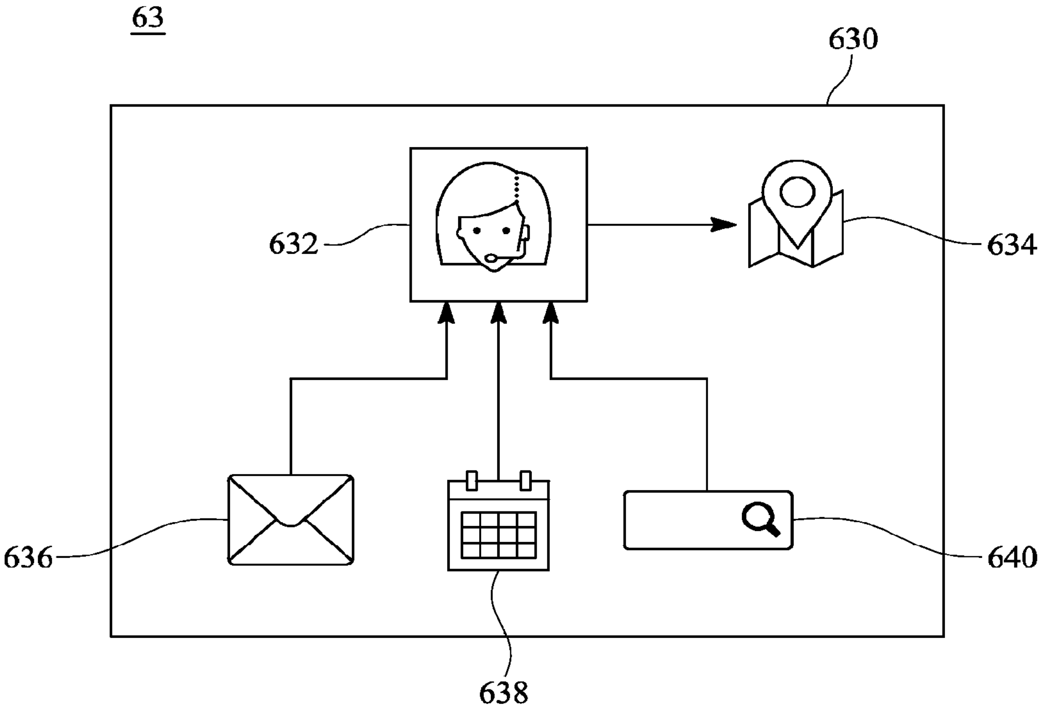
FIG. 6D illustrates an embodiment 63 of a user interface showing a mobile secretary cloud application operating a map application.

FIG. 6D demonstrates an embodiment 63 of a software program product user interface 630 in accordance with the invention as a screen shot diagram. The user interface 630 shows the mobile secretary cloud application 632 operating the map application 634. The user interface 630 could be displayed for example on the display screen of the mobile client device i.e. a smartphone.

In an embodiment, the software program product user interface 630 is shown to comprise the mobile secretary cloud application 632 operating the map application 634. The mobile secretary cloud application 632 using the map application 634 provides a route calculator that provides a combined route of driving and walking based on e-mails, calendar entries, and location search. The e-mails may be accessed from the e-mail/messaging application 636, calendar entries may be accessed from the calendar application 638, and location search performed by the user may be accessed from a location search application 640 or Internet browser. The mobile secretary cloud application 632 upon accessing data present in the e-mails and the calendar entries may determine a date and time of reaching a location by the user. The mobile secretary cloud application 632 may determine multiple routes for reaching the location. Further, mobile secretary cloud application 632 may access recent location searches performed by the user, and may utilize such information for filtering the multiple routes. In one case, the mobile secretary cloud application 632 may provide the user with a route which is most familiar to the user, i.e. the user has been through at least once.

In one case, the mobile secretary cloud application 632 may identify multiple calendar entries present in the calendar application 638, for a particular day. The user may need to visit multiple locations for attending different meetings scheduled on the day. In such case, the mobile secretary cloud application 632, using the map application 634 may provide a route map to the user, such that a least distance or time will need to be travelled to visit all the locations.

Any features of embodiment 63 may be readily combined or permuted with any of the other embodiments 10, 11, 20, 21, 30, 31, 40, 41, 50, 60, 61, 62, 71, 81, and/or 82 in accordance with the invention.

In the preceding description it has been described how the intelligent secretary mobile application arrives at good or optimum outcomes in secretarial tasks using machine learning and artificial intelligence. As explained before, this is typically achieved by taking a training set of substantial size, typically 30,000 samples or so, and teaching the computer with a validation set of about 5000 samples what is an acceptable choice and what is not an acceptable choice. This principle is applied to different secretarial tasks regardless of the data format of the output. For example, if the secretarial task is looking at emails and judging which emails are genuine and important, the sample sets used will be semantic data. i.e. words and content of the email, its metadata (sender, recipient, time, title) and also optionally the image of the email. The type setting, colors, layout, all visual factors contribute to the decision of how to characterize the email.

If the secretarial task is interaction on the phone, the training sets and validation sets will likely be audio soundtrack and dial tone entries. If the secretarial task is route planning, the training and validation sets will be the routes. If the secretarial task is booking flight tickets, the training and validations sets will be flight tickets.

Typically, the mobile secretary cloud application 602, 612, 622, 632, will be conducting Internet searches from time to time automatically to find a result(s) that would be satisfactory to the AI model in the terminal device and cloud network. This means that if a good enough route, flights, or the like is not found, the secretary application can continue to conduct Internet searches to find a satisfactory result for the user on his behalf.

In the aforementioned description, the mobile secretary cloud application 602, 612, 622, 632 has been described, and how the mobile secretary cloud application arrives at good or optimum outcomes in secretarial tasks using machine learning and artificial intelligence. It is also in accordance with some embodiments of the invention to combine optimized results of individual secretarial outcomes to arrive at an optimized agenda for an entire day for the user. This is achieved as follows. The terminal computer 200, 500 and cloud network 216, 516 is presented with a training set of 30,000 or so daily agendas, and a validation set of a few thousand agendas to teach the mobile secretary cloud application 602, 612, 622, 632 and the cloud server network 216, 516 to distinguish between a good daily agenda for the user, and an unacceptable agenda for the user. When the mobile secretary cloud application 602, 612, 622, 632 determines the individual outcomes to the secretarial tasks, it will then fit these tasks to a daily agenda. This daily agenda will then be compared with the AI model, and the agenda that is accepted by the trained AI model is presented to the user with the secretarial outcomes in accordance with the agenda. In some embodiments an agenda for a week, month and/or year, or any unit of time is similarly composed, using an AI model as explained before mutatis mutandis.

For each secretarial task, the mobile secretary cloud application 602, 612, 622, 632 can be trained with deep-learning datafiles. These deep learning data files may reside on a cloud server to which the client device, i.e. typically a mobile phone is connected to via Wi-Fi or cellular connection. The mobile secretary cloud application 602, 612, 622, 632 can be trained to conduct new secretarial tasks on behalf of the user by providing new sets of deep learning data files. Similarly, secretarial activities that the mobile secretary cloud application 602, 612, 622, 632 already performs can be improved by updating deep learning data files. The training and validation datasets for any activity can be updated from time to time so that the mobile secretary cloud application 602, 612, 622, 632 recognizes the need for an appropriate secretarial task with the best accuracy, and that the mobile secretary cloud application 602, 612, 622, 632 fulfills the task with the best accuracy.

The mobile secretary cloud application 602, 612, 622, 632 may record tasks that it performs either in the form of a computing session, a recording of a synthesized phone conversation, and/or text, and/or images of messages or sessions that the mobile secretary cloud application 602, 612, 622, 632 performs. The recordings of past tasks may be used to enrich the deep learning data files. The deep learning data files may reside on either the client device such as the mobile phone or in the cloud in accordance with some embodiments of the invention. The deep learning data files may be shared by one or more cloud servers between different users in some embodiments. In some embodiments the origin of the deep learning data files used to train the mobile secretary cloud application 602, 612, 622, 632 is concealed from the user, in order to protect the privacy of those users from whom the deep learning data files originate. It is also in accordance with some embodiments of the invention that every user generates all or some of their own deep learning data files.

Figure 7:
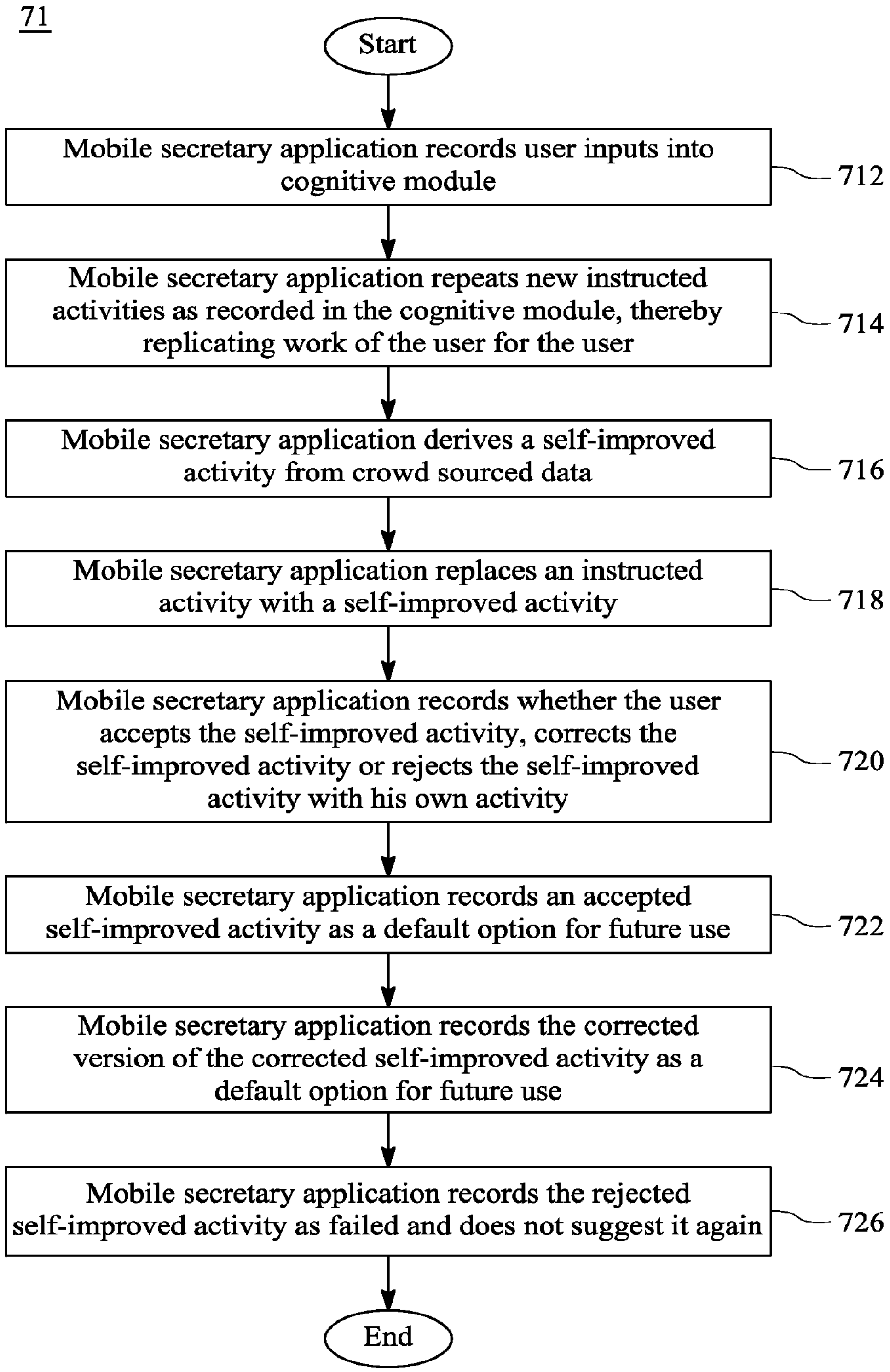
FIG. 7 demonstrates a machine-learning embodiment 71 of the invention as a flow diagram.

FIG. 7 demonstrates a machine-learning embodiment 71 of the invention as a flow diagram. In phase 712 the mobile cloud secretary application records user inputs into a cognitive software module. The purpose of the recording is to establish a baseline profile for the cognitive process of the user. The cognitive process here means how the user comprehends the incoming messages and changes in applications in the mobile phone, and how he responds and interacts with to the messages or application changes. The cognitive module records for example keypresses, application sessions, user input, and user responses to certain situations in the operating system or applications. Suppose for example a calendar entry email, or an email suggesting an appointment to pick up the kids comes into the inbox. The cognitive module records that the user always enters it into his calendar very briefly as "pick up kids". The user does not elaborately describe or explain the circumstances of the pickup.

In phase 714 the mobile secretary cloud application repeats new instructed activities as recorded in the cognitive module, thereby replicating work of the user for the user. Thus, when the appointment email comes into the inbox, the mobile secretary cloud application simply makes the calendar entry "pick up kids" into the calendar application of the user, in line with the detected cognitive process of the user. It is easy for the user to comprehend this calendar entry, as it looks like he made it himself. This is a big advantage to just accepting a calendar entry that someone else wrote, which might be incomprehensible, and probably also longer in text.

In phase 716 the mobile secretary cloud application derives a self-improved activity from crowd sourced data. As the crowd sourced data shows that many people choose to have an alert set up 2 hours before when something is entered into calendar about kids, the mobile secretary cloud application introduces this improvement automatically.

The self-improved activity is typically determined by machine learning from crowd sourced data. This can be done by choosing an input presentation, i.e. the variable from which the best response depends from in the crowd sourced data. Then a regression model is typically fitted with the crowd sourced data. For example here, the duration of the time interval before the actual event could be fitted against the satisfaction rate of the alert (i.e. the rate at which the users approve and use the alert, without changing it to another time). Preferably, the alert interval providing the highest satisfaction rate from users is selected as the alert interval for the self-improved activity.

Different methods may be used in the mobile cloud secretary application trying to improve and rationalize its operation with self-improved activities with creative suggestions on the one hand, and common sense inducing machine learning features on the other hand. Typically crowd-sourcing is used to introduce common senseness into the self-improvements. A wide user base is unlikely to use software completely irrationally.

Creativeness is introduced by supervised learning and/or reinforcement learning. For example, in the reinforcement learning example, the alert interval could be chosen based on an approximation of the maximum probability at which the user will accept the self-improvement without modifications, based on crowdsourced data.

In the supervised learning example, the alert could be defined so the user has sufficient time, with for example a buffer of 30 minutes from the location of the user, to arrive at the pickup location of kids to pick them up. The mobile secretary cloud application will know that the outcome of the alert interval will need to be such that the alert will provide sufficient time for the user to arrive between 0-30 minutes before to the pick-up location of the kids. As the cloud secretary application follows the locations and routes of the user to the pick-up location every day, and for example the general traffic information, the cloud secretary application learns to position the alert in space and time so that the user embarks on his journey to pick up the kids at the right time and is never late. This embodiment saves a lot of planning effort, time and/or frustration for the human user.

In phase 718 the mobile secretary cloud application replaces an instructed activity with a self-improved activity. When the next appointment email related to picking up the kids comes into the email inbox, the mobile secretary application automatically adds an alarm 2 hours before the pickup time to the calendar entry. The mobile secretary cloud application adds an alert to the simple "pick up kids" entry, 2 hours before the pick-up time, providing a sound, vibration and/or screen alert to the user 2 hours before the kids' pick-up time.

In phase 720 the mobile secretary cloud application records whether the user accepts the self-improved activity, corrects the self-improved activity or rejects the self-improved activity with his own activity. In some embodiments the mobile secretary cloud application may ask the user to suggest what the improvement should be: For example, with a multiple choice, or free form text entry, or by requesting the user to provide voice feedback which is then voice recognized. For example, Siri on an Apple handset and Google Assistant on an Android handset could be used to implement this functionality. The feedback is then transmitted to the cloud servers for further analysis.

In phase 722 the mobile secretary cloud application records an accepted self-improved activity as a default option for future use. If the user simply starts to use the 2-hour alerts, it is likely that the self-improved activity by the mobile secretary cloud application is desirable by the user as well.

In phase 724 the mobile secretary cloud application records the corrected version of the corrected self-improved activity as a default option for future use. If it is detected that the user tends to move the alert closer to the activity, for example to 1 hour before the pick-up time of kids, the mobile secretary cloud application will update the default calendar entry to include an alert 1 h before the actual pick-up time of kids.

In phase 726 the mobile secretary application records the rejected self-improved activity as failed and does not suggest it again. This happens when the user routinely deletes all alerts, and clearly does not want the mobile phone to alert him.

In one embodiment of the invention the mobile secretary application observes for example from GPS data whether the user arrives in time for the pick-up of kids. The mobile secretary cloud application can deduce from email etc. the location of the kids' school, or the user may simply provide the location manually to the mobile secretary cloud application. Also, the mobile phones of the children might be connected to the cloud account of the user, thereby providing the location of the kids to the mobile cloud secretary application. As both the parent and the child locations are known, the mobile cloud secretary application can be aware of the time and distance separating the parent and the children, and calculate the time of the alarm for the kid's pick-up accordingly. In one embodiment the mobile secretary cloud application times the alarm so that there is a sufficient estimated travel time between the alert and the pick-up to get to the pick-up location.

In another embodiment, if the estimation of the suitable alert time proves difficult for the mobile secretary cloud application, in that the responses of the user indicate dissatisfaction by the user deleting the alerts or changing them multiple times and/or randomly. Then the mobile secretary application may escalate the issue to the user, and request the user to manually specify a suitable alert time for this type of calendar entry.

Any features of embodiment 71 may be readily combined or permuted with any of the other embodiments 10, 11, 20, 21, 30, 31, 40, 41, 50, 60, 61, 62, 63, 81, and/or 82 in accordance with the invention. The machine learning method of embodiment 71 is applicable also to the other earlier mentioned use scenarios, such as sorting emails, making reservations, and finding the right route, for example.

Figure 8A:
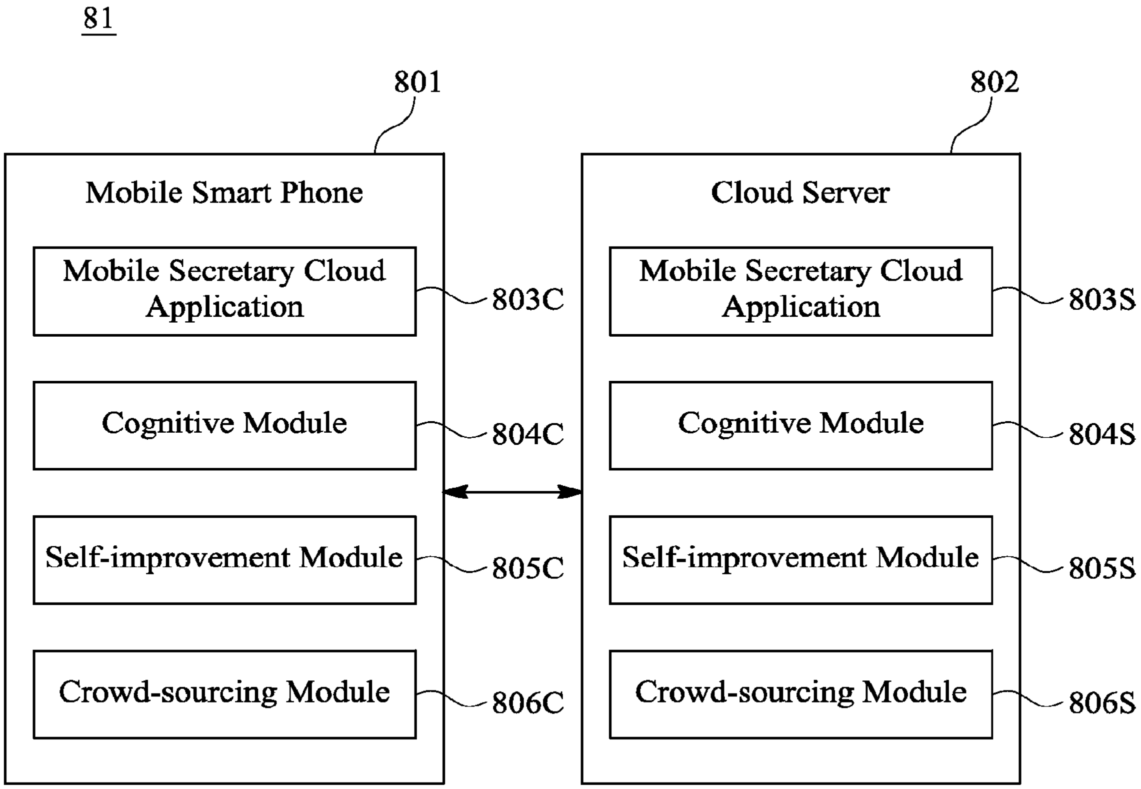
FIG. 8A shows an embodiment 81 of the invention wherein the machine learning modules are separate from the mobile secretary cloud application.

FIG. 8A shows an embodiment 81 wherein the machine learning modules are separate from the mobile secretary cloud application 803C and 803S, wherein "C" denotes the client side and "S" denotes the server side. In this embodiment the secretarial functions are implemented separately by the mobile secretary cloud application 803C and 803S, and it uses the data and services from a separate cognitive module 804C and 804S, self-improvement module 805C and 805S, and crowd-sourcing module 806C and 806S. This architecture is useful for example in the situation where the operating system already has a cognitive module 804C, 804S, self-improvement module 805C, 805S and/or a crowd-sourcing module 806C, 806S.

Cloud services, such as for example Apple Location Services are known to track iPhone user behavior so that a lot of crowd-sourced data is collected from probably millions of iPhone and iCloud users. Similarly, Google tracks crowd sourced data of all or some Android users. It is in accordance with some embodiments of the invention to use this crowd-sourced data with the cognitive module 804C and 804S and/or the self-improvement module 805C and 805S of the user, with a crowd sourcing software module 806C, 806S, or without.

In one embodiment the cognitive 804C, 804S and the self-improvement modules 805C, 805S are realized as integrated into the mobile secretary cloud application 803C and 803S, but the crowd-sourced data is obtained from Apple or Google via their respective API's (Application Programmer Interface) to avoid duplication of work and activity. Quite clearly, any permutation or combination of the cognitive 804C, 804S, self-improvement 805C, 805S, and crowd-sourcing 806C, 806S-modules is in accordance with some embodiments of the invention. These modules 804C, 804S, 805C, 805S, 806C, 806S are preferably implemented with the cloud based client-server architecture. However in some embodiments it is possible that a module is implemented exclusively on the client device only or the server computer only. For example the cognitive module 804C might be limited to the client device in some embodiments, thereby providing better information security and privacy from the perspective of the individual user.

Any features of embodiment 81 may be readily combined or permuted with any of the other embodiments 10, 11, 20, 21, 30, 31, 40, 41, 50, 60, 61, 62, 63, 71, and/or 82 in accordance with the invention.

Figure 8B:
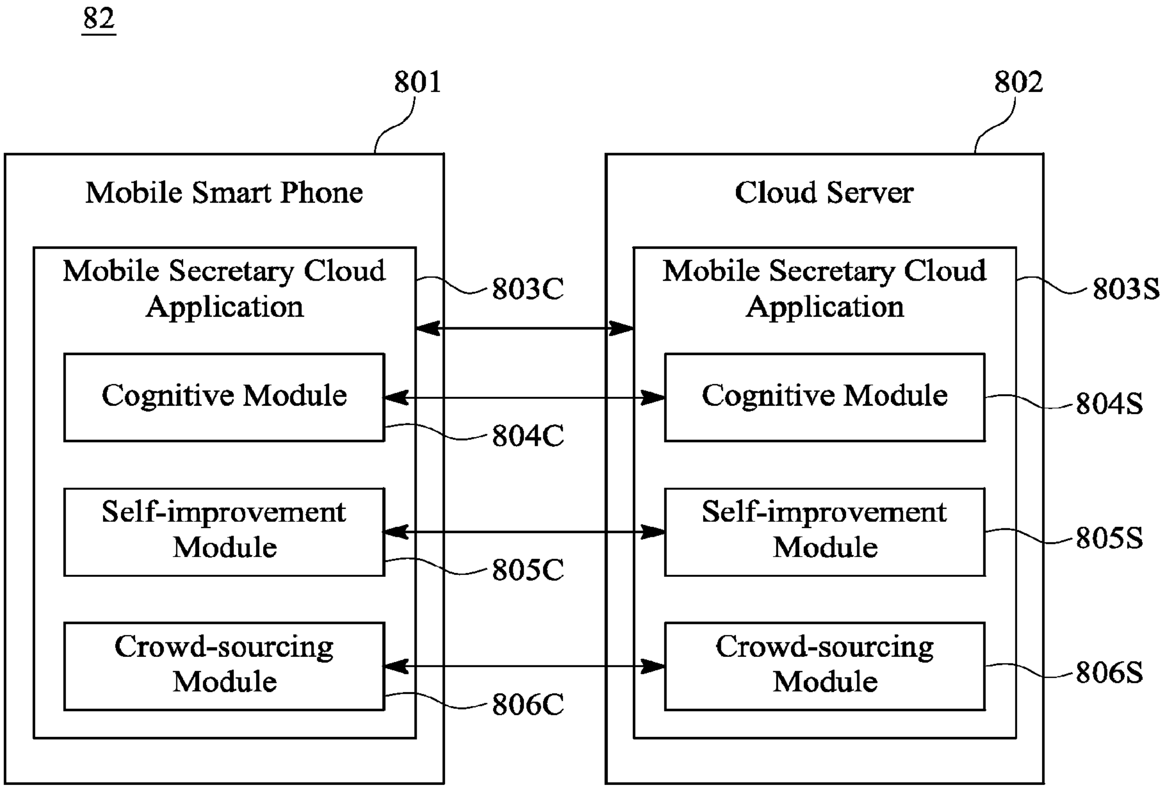
FIG. 8B shows an embodiment 82 of the invention where the machine learning modules are integrated into the mobile secretary cloud application.

FIG. 8B shows an embodiment 82 where the machine learning modules are integrated into the mobile secretary cloud application. Both the client (C) and the server (S) side software of the cognitive module 804C and 804S, self-improvement module 805C and 805S, and crowd-sourcing module 806C and 806S are realized within the mobile secretary cloud application 803C and 803S. This architecture is useful in that the mobile secretary cloud application is typically more independent from the underlying operating system in this way.

Any features of embodiment 82 may be readily combined or permuted with any of the other embodiments 10, 11, 20, 21, 30, 31, 40, 41, 50, 60, 61, 62, 63, 71, and/or 81 in accordance with the invention.

Embodiments of the invention have been explained in the aforementioned and sizeable advantages of some embodiments of the invention have been demonstrated. Some embodiments of invention allow the mobile secretary cloud application 602, 612, 622, 632 to replicate the secretarial functions to a normal consumer at a very small cost. The mobile secretary cloud application 602, 612, 622, 632 produces draft responses to emails and messages, interacts on the phone on behalf of the user, and makes purchases such as flight tickets on behalf of the user. The mobile secretary cloud application 602, 612, 622, 632 also sorts and archives emails and messages to different folders, arranges tasks for the user based on priority and urgency, and selects routes and agendas for the day. Similarly, the mobile secretary cloud application 602, 612, 622, 632 updates data from one application to the other, for example emailed agreements of meetings to the calendar and provides different indication sounds alerting the user to the category or vibe of an incoming message. Any secretarial task can be performed by the mobile secretary cloud application 602, 612, 622, 632 and cloud network 216, 516 as long as the system is trained to produce and distinguish an acceptable secretarial work product with training and validations sets of the said secretarial work product in accordance with some embodiments of the invention.

The invention has been explained above with reference to the aforementioned embodiments. However, it is clear that the invention in not only restricted to these embodiments, but comprises all possible embodiments within the spirit and scope of the inventive thought and the following patent claims.

REFERENCES

US 2013/0110519 A1 DETERMINING USER INTENT BASED ON ONTOLOGIES OF DOMAINS, published on May 2, 2013, Adam et al.

WO 2014/197635 A2 INTELLIGENT AUTOMATED ASSISTANT, published on Dec. 11, 2014, Thomas et al.

US 2016/0155442 A1 EXTENDING DIGITAL PERSONAL ASSISTANT ACTION PROVIDERS, published on Jun. 2, 2016, Vishvac et al.

A PRACTICAL INTRODUCTION TO DEEP LEARNING WITH CAFFE AND PYTHON, published on Jun. 26, 2016, Adil Moujahid.

INTRODUCING ARTIFICIAL INTELLIGENCE A GRAPHIC GUIDE, Henry Brighton, Iconbooks 2003.
MACHINE LEARNING THE NEW AI, Ethem Alpaydin, The MIT Press 2016.
THE TECHNOLOGICAL SINGULARITY, Murray Shanahan, The MIT Press, 2015.
THE UNREASONABLE EFFECTIVENESS OF DATA, A. Halevy, P. Norvig and F. Pereira, IEEE Intelligent Systems 8-12, 2009

I claim:

1. A non-transitory computer readable medium including instructions for performing operations for one or more software program products to operate with a client device connected to a cloud server network via a communication network, the operations comprising:
- reading, by at least one of the software program products, data from a messaging application;
- operating, by at least one of the software program products, the messaging application, based on the data from the messaging application, wherein operating the messaging application includes analyzing and sorting messages; and
- analyzing the inbound messages, using at least one of the semantic artificial intelligence models, based on content of the inbound messages; and
- using, by at least one of the software program products, one or more semantic artificial intelligence models trained using data collected from a plurality of users, and use the one or more applications independently of the user for performing the tasks on behalf of the user, wherein the tasks include providing one or more draft answers to queries included in inbound messages, automatically to the user via the applications, and:
- wherein the cloud server network repeatedly updates artificial intelligence files for a number of tasks, and makes the artificial intelligence files available to the software program products to operate with the client device, and the user completes the draft answers by manual typing prior to sending.

2. The non-transitory computer readable medium of claim 1, wherein at least one of: (i) providing the one or more draft answers to queries or (ii) organizing an agenda, is further based on a prior input by the user for at least one of the one or more applications.

3. The non-transitory computer readable medium of claim 2, wherein the at least one of: (i) providing the one or more draft answers to queries or (ii) organizing the agenda, at least partially replicates the prior input by the user using at least one of the semantic artificial intelligence models.

4. The non-transitory computer readable medium of claim 1, wherein at least one of: (i) providing the one or more draft answers to queries or (ii) organizing an agenda, is further based on using crowd sourced data with the at least one of the semantic artificial intelligence models.

5. The non-transitory computer readable medium of claim 1, wherein at least one of the software program products analyzes messages from the messaging application and selects an indication sound automatically based on one or more of: contents of the messages, sender of the messages or one or more recipients of the messages.

6. The non-transitory computer readable medium of claim 1, wherein at least one of the software program products provides a route calculator via a map application that provides a combined route of driving and walking based on data from all of: (i) the email or calendar application, (ii) a search application, and (iii) an Internet browser.

7. The non-transitory computer readable memory of claim 1, wherein the one or more applications are operated with using the one or more semantic artificial intelligence models to produce an agenda.

8. The non-transitory computer readable medium of claim 1, wherein an agenda comprises a plurality of activities and organizing the agenda for the user comprises determining an optimum total fit of all of the combined plurality of activities in the agenda for a unit of time.

9. The non-transitory computer readable medium of claim 1, wherein providing the one or more draft answers to queries included in inbound messages comprises individually determining draft responses to the queries, and guiding the user through the responses.

10. The non-transitory computer readable medium of claim 1, wherein the inbound messages comprises an email, and wherein analyzing the inbound messages comprises associating a meaning to the email based on semantic content in the email.

11. A system for performing operations for one or more software program products to operate with a client device connected to a cloud server network via a communication network, comprising:
- a processor; and
- a memory connected to the processor and storing instructions for the one or more software program products, wherein the processor is configured to execute the software program products to perform the operations, comprising:
  - reading, by at least one of the software program products, data from a messaging application;
  - operating, by at least one of the software program products, the messaging application, based on the data from the messaging application, wherein operating the messaging application includes analyzing and sorting messages; and
- analyzing the inbound messages, using at least one of the semantic artificial intelligence models, based on content of the inbound messages; and
- using, by at least one of the software program products, one or more semantic artificial intelligence models trained using data collected from a plurality of users, and use the one or more applications independently of the user for performing the tasks on behalf of the user, wherein the tasks include providing one or more draft answers to queries included in inbound messages, automatically to the user via the applications, and
- wherein the cloud server network repeatedly updates artificial intelligence files for a number of tasks, and makes the artificial intelligence files available to the software program products to operate with the client device, and the user completes the draft answers by manual typing prior to sending.

12. The system of claim 11, wherein at least one of: (i) providing the one or more draft answers to queries or (ii) organizing an agenda, is further based on a prior input by the user for at least one of the one or more applications.

13. The system of claim 12, wherein the at least one of: (i) providing the one or more draft answers to queries or (ii) organizing the agenda, at least partially replicates the prior input by the user using at least one of the semantic artificial intelligence models.

14. The system of claim 11, wherein at least one of: (i) providing the one or more draft answers to queries or (ii) organizing an agenda, is further based on using crowd sourced data with the at least one of the semantic artificial intelligence models.

15. The system of claim 11, wherein at least one of the software program products analyzes messages from the messaging application and selects an indication sound automatically based on one or more of: contents of the messages, sender of the messages or one or more recipients of the messages.

16. The system of claim 11, wherein at least one of the software program products provides a route calculator via a map application that provides a combined route of driving and walking based on data from all of: (i) the email or calendar application, (ii) a search application, and (iii) an Internet browser.

17. The system of claim 11, wherein the one or more applications are operated with using the one or more semantic artificial intelligence models to produce an agenda.

18. The system of claim 11, wherein the agenda comprises a plurality of activities and organizing an agenda for the user comprises determining an optimum total fit of all of the combined plurality of activities in the agenda for a unit of time.

19. The system of claim 11, wherein providing the one or more draft answers to queries included in inbound messages comprises individually determining draft responses to the queries, and guiding the user through the responses.

20. The system of claim 11, wherein the inbound messages comprises an email, and wherein analyzing the inbound messages comprises associating a meaning to the email based on semantic content in the email.

* * * * *